US010754121B2

(12) United States Patent
Tomura et al.

(10) Patent No.: US 10,754,121 B2
(45) Date of Patent: Aug. 25, 2020

(54) DISPLACEMENT DETECTING APPARATUS, LENS BARREL, AND IMAGING APPARATUS

(71) Applicant: CANON KABUSHIKI KAISHA, Tokyo (JP)

(72) Inventors: Kaori Tomura, Inagi (JP); Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 15/959,588

(22) Filed: Apr. 23, 2018

(65) Prior Publication Data

US 2018/0321458 A1    Nov. 8, 2018

(30) Foreign Application Priority Data

May 8, 2017    (JP) ................. 2017-092639

(51) Int. Cl.
| | |
|---|---|
| *G02B 7/02* | (2006.01) |
| *G02B 7/04* | (2006.01) |
| *G03B 13/32* | (2006.01) |
| *G01D 5/241* | (2006.01) |
| *G03B 17/56* | (2006.01) |
| *G03B 17/14* | (2006.01) |

(52) U.S. Cl.
CPC ............ *G02B 7/04* (2013.01); *G01D 5/2415* (2013.01); *G03B 13/32* (2013.01); *G03B 17/14* (2013.01); *G03B 17/565* (2013.01)

(58) Field of Classification Search
CPC . G02B 7/04; G02B 7/10; G02B 7/102; G02B 7/09
See application file for complete search history.

(56) References Cited

U.S. PATENT DOCUMENTS 4,633,249 A * 12/1986 Sasaki ................. G01D 5/2415
                                                          324/725
6,856,477 B2 *  2/2005 Morimoto ............. G01D 5/366
                                                          324/207.13

FOREIGN PATENT DOCUMENTS

| JP | 2009189132 A | 8/2009 |
| JP | 2012255899 A | 12/2012 |
| JP | 2017009375 A | 1/2017 |

* cited by examiner

*Primary Examiner* — Joseph P Martinez
(74) *Attorney, Agent, or Firm* — Rossi, Kimms & McDowell LLP

(57) ABSTRACT

A displacement detecting apparatus includes a first electrode including a base electrode segment and a plurality of detecting electrode segments, a second electrode having a predetermined periodic pattern and movable relative to the first electrode, a detector configured to detect a displacement based on a capacitance between the first electrode and the second electrode, and a wiring configured to connect the plurality of detecting electrode segments and the detector with each other. A portion of the wiring facing the second electrode is located opposite to the second electrode with respect to the base electrode segment.

9 Claims, 17 Drawing Sheets

FIG. 8A
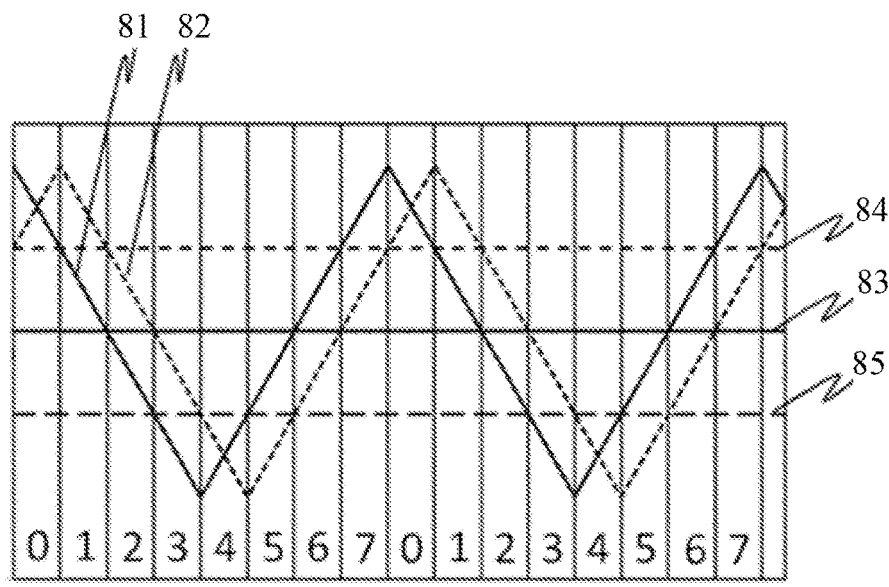
FIG. 8B
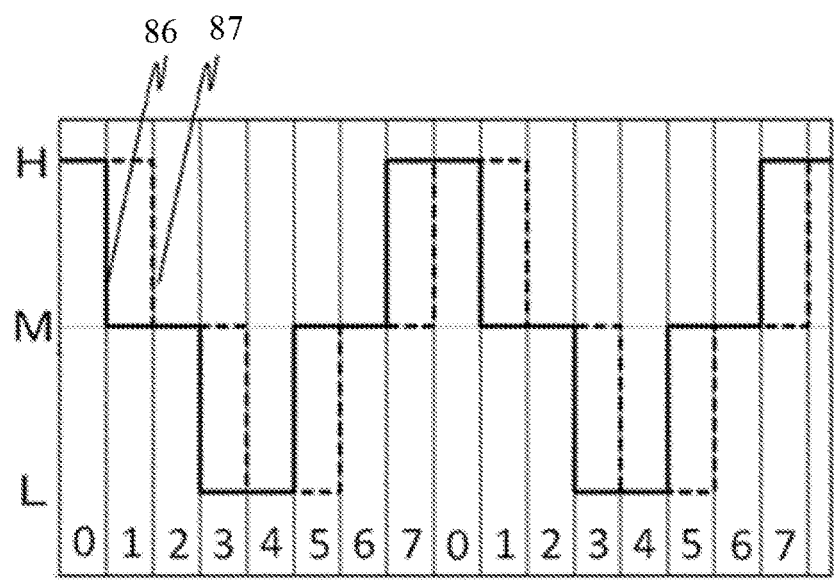
FIG. 8C
| STATUS | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| $S_{1P}$ | H | M | M | L | L | M | M | H | H | M | M | L | L | M | M | H |
| $S_{2P}$ | H | H | M | M | L | L | M | M | H | H | M | M | L | L | M | M |

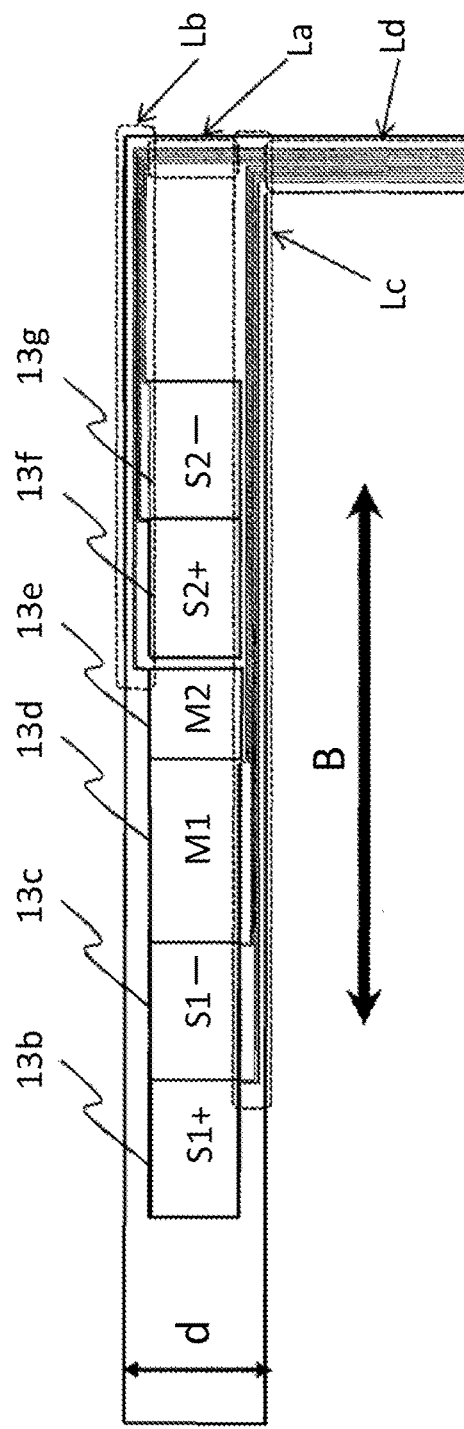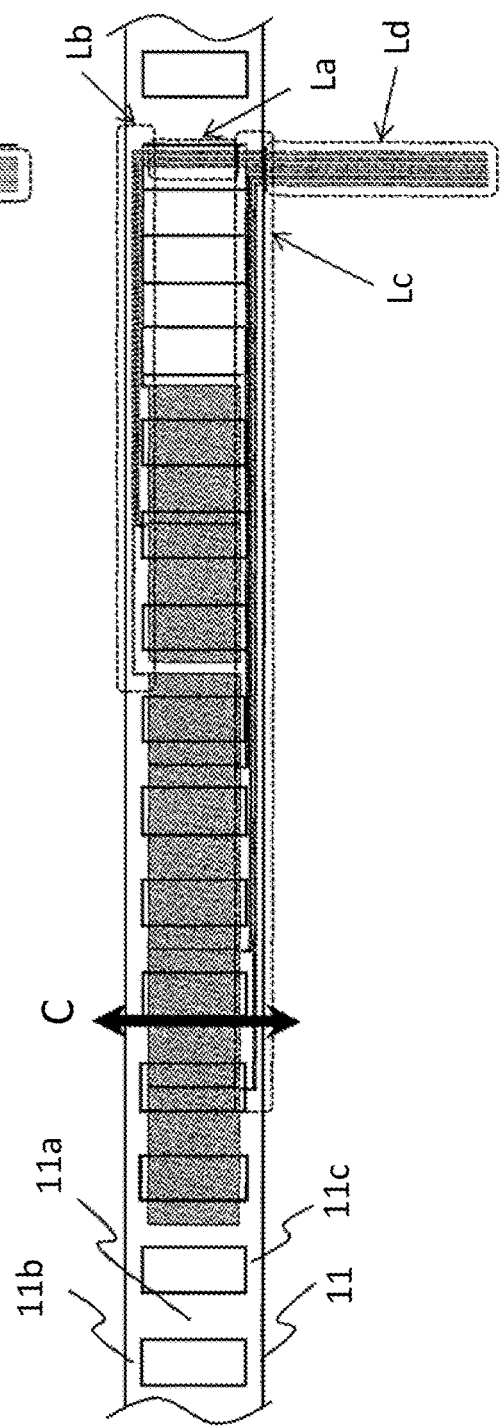
FIG. 14A
FIG. 14B

DISPLACEMENT DETECTING APPARATUS, LENS BARREL, AND IMAGING APPARATUS

BACKGROUND OF THE INVENTION

Field of the Invention

The present invention relates to a lens barrel that can be mounted on an optical apparatus, such as a video camera and a digital still camera.

Description of the Related Art

A conventional lens barrel includes a so-called manual focus (MF) function that detects a rotation of an operating ring through an electric unit and electrically drives a focus (or focusing) lens in accordance with the rotation.

Japanese Patent Laid-Open No. ("JP") 2012-255899 discloses a lens barrel that detects passages of a plurality of slits (notches) arranged at regular intervals in a circumferential direction of a rotatable unit through a pair of photo-interrupters and detects a rotating direction and rotating amount of the rotatable unit based on the detection signal. The lens barrel disclosed in JP 2012-255899 rotates a screw in a stepping motor in accordance with rotation information (rotating direction and rotating amount) of the rotatable unit, and realizes a manual focusing mode (MF function) following motions of a nut engaged with the screw.

The lens barrel disclosed in JP 2012-255899 detects a rotation of the rotatable unit through a non-contact type structure using the pair of photo-interrupters so as to provide the MF function. However, the photo-interrupter needs a comparatively large consumption current amount. In addition, as long as none of the outputs in the pair of photo-interrupters changes, the rotation of the rotatable unit cannot be detected. It is thus difficult for a structure that uses the pair of photo-interrupters to improve the rotation detecting resolution and to accurately detect a displacement.

SUMMARY OF THE INVENTION

The present invention provides a displacement detecting apparatus, a lens barrel, and an imaging apparatus with a low power consumption, a high resolution, and a high accuracy.

A displacement detecting apparatus according to the present invention includes a first electrode including a base electrode segment and a plurality of detecting electrode segments, a second electrode having a predetermined periodic pattern and movable relative to the first electrode, a detector configured to detect a displacement based on a capacitance between the first electrode and the second electrode, and a wiring configured to connect the plurality of detecting electrode segments and the detector with each other. A portion of the wiring facing the second electrode is located opposite to the second electrode with respect to the base electrode segment.

A lens barrel according to another aspect of the present invention includes a fixed member, a movable member movable relative to the fixed member, and the above displacement detecting unit.

An image capturing apparatus according to another aspect of the present invention includes the lens barrel, and an image sensor configured to photoelectrically convert an optical image formed via an optical system in the lens barrel.

Further features of the present invention will become apparent from the following description of exemplary embodiments with reference to the attached drawings.

BRIEF DESCRIPTION OF THE DRAWINGS

FIGS. 8A, 8B, and 8C are graphs illustrating a displacement signal based on a capacitance formed by the fixed electrode and the movable electrode according to each embodiment.

FIGS. 14A and 14B illustrate wirings in detection electrodes and a movable electrode according to the third embodiment.

DESCRIPTION OF THE EMBODIMENTS

Referring now to the accompanying drawings, a description will be given of embodiments according to the present invention.

Figure 1:
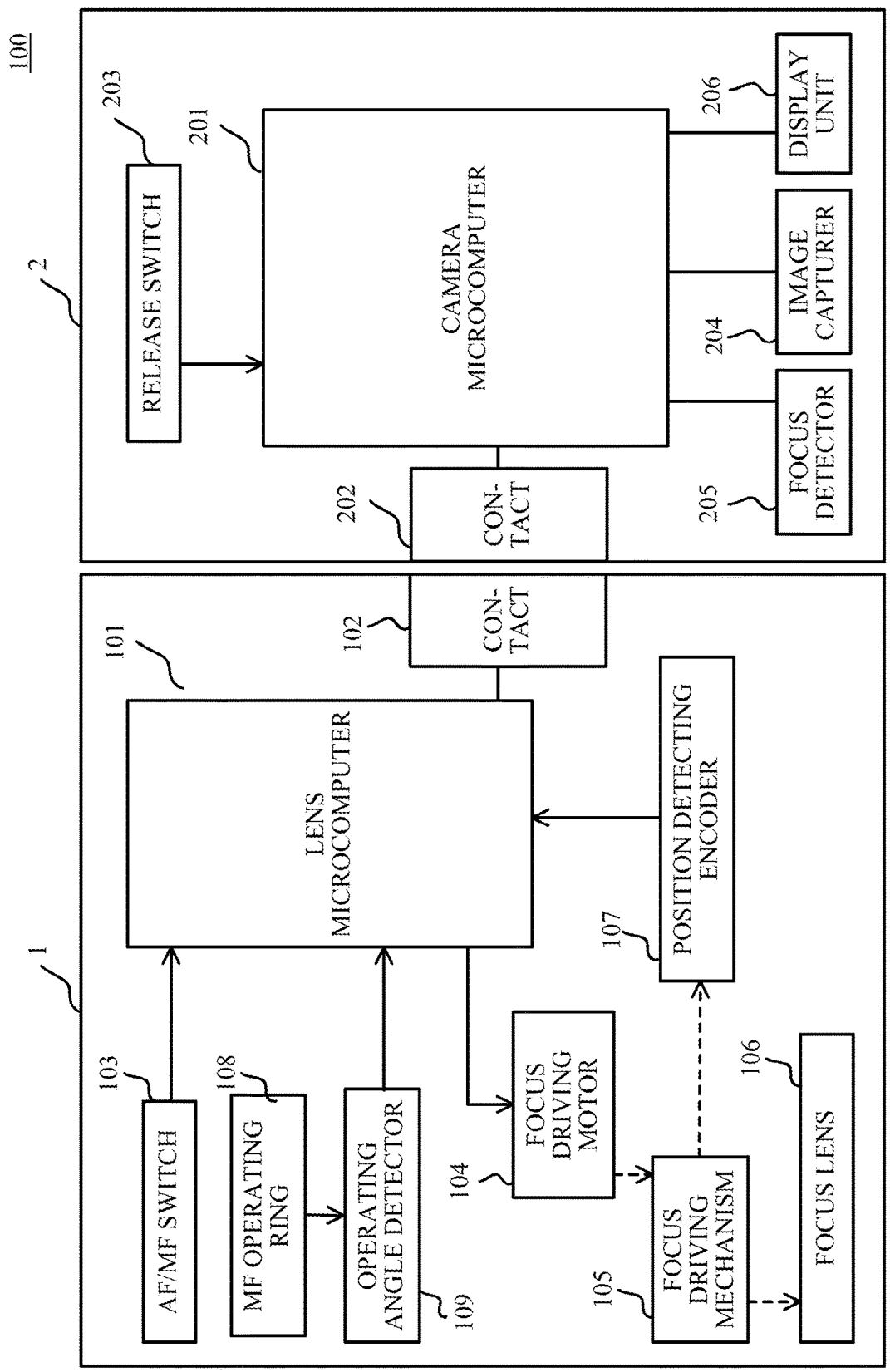
FIG. 1 is a block diagram of an imaging apparatus according to each embodiment.

Referring now to FIG. 1, a description will be given of structures of an imaging apparatus according to a first embodiment of the present invention that includes an imaging apparatus body or single-lens reflex camera and a lens apparatus or an interchangeable lens detachably attached to the imaging apparatus body. FIG. 1 is a block diagram of an imaging apparatus 100 according to this embodiment. In FIG. 1, a solid line that connects blocks means an electric wiring connection and a broken line means a mechanical connection.

The imaging apparatus 100 includes a camera 2 (imaging apparatus body) and an interchangeable lens 1 (lens barrel)

detachably attached to the camera 2. Reference numeral 201 denotes a camera microcomputer (controller), and reference numeral 202 denotes a contact. The camera microcomputer 201 controls each component in the camera 2, as described above, and communicates with the interchangeable lens 1 via the contact 202 when the interchangeable lens 1 is attached.

Reference numeral 203 denotes a two-stage stroke type release switch. A signal output from the release switch 203 is input to the camera microcomputer 201. In accordance with the signal input from the release switch 203, the camera microcomputer 201 determines an exposure amount by a photometric unit (not shown), provides an AF operation, which will be described later, and enters an imaging preparation state, when the first stroke switch (SW1) turns on. The camera microcomputer 201 when the camera microcomputer 201 detects that the release switch 203 is operated and the second stroke switch (SW2) turns on, sends an imaging start command to an image capturer 204 so as to provide an actual exposure operation. The image capturer 204 includes an image sensor, such as a CMOS sensor and a CCD sensor, which photoelectrically converts an optical image formed via the interchangeable lens 1 (optical system) and outputs an image signal.

Reference numeral 205 denotes a focus detector. When the camera 2 is set to the following AF mode and SW1 in the release switch 203 turns on, the focus detector 205 detects a focus state on the object in a focus detecting area in accordance with the focus detection starting command sent from the camera microcomputer 201. The focus detector 205 determines moving information, such as a moving direction and a moving amount, in an optical axis direction of the focus lens 106 necessary to focus on this object as a result of the focus detection. Reference numeral 206 denotes a display unit configured to display a captured image obtained by the image capturer 204, etc.

Reference numeral 101 denotes a lens microcomputer (controller) in the interchangeable lens 1. The lens microcomputer 101 controls each component in the interchangeable lens 1, as described later, and communicates with the camera 2 via a contact 102. Reference numeral 103 denotes an AF/MF switch that switches between the autofocus and the manual focus, and is used for a user to select a focus mode among the AF (autofocus) mode and the MF (manual focus) mode.

In the AF mode, the camera microcomputer 201 sends to the lens microcomputer 101 the focus detection result determined by the focus detector 205 as the SW1 in the release switch 203 turns on. The lens microcomputer 101 drives the focus driving motor 104 that generates a driving force by the electric energy based on this focus detection result. The driving force of the focus driving motor 104 is transmitted to the focus driving mechanism 105. The focus driving mechanism 105 drives the focus lens 106 in the optical axis direction by a necessary driving amount in accordance with the driving force of the focus driving motor 104. The focus driving motor 104 may use a stepping motor, an ultrasonic wave motor, etc. The focus driving mechanism 105 may use a so-called bar-sleeve supported direct-acting mechanism, and a so-called rotating cam mechanism that uses a cooperation of a cam ring having three cam grooves and three linear grooves provided to a fixed member.

Reference numeral 107 denotes a position detecting encoder (position detector). The position detecting encoder 107 is, for example, an absolute encoder that outputs information corresponding to a position of the focus lens 106 in the optical axis direction. The position detecting encoder 107 may use a photo-interrupter configured to determine a reference position, and to detect an absolute position with an integrated value of an incremental signal having fine intervals, such as a driving pulse number from the stepping motor and a repetitive signal from an MR sensor.

In the AF motor, the lens microcomputer 101 controls driving of the focus driving motor 104 in accordance with a necessary moving amount of the focus lens 106 determined based on the focus detecting result by the focus detector 205. When the necessary moving amount of the focus lens 106 is equal to the actual moving amount as the detection result by the position detecting encoder 107, the lens microcomputer 101 stops the focus driving motor 104 and sends a focus control termination to the camera microcomputer 201.

On the other hand, in the MF mode, the user can control focusing by operating the MF operating ring 108 (movable member). Reference numeral 109 denotes an operating angle detector (displacement detecting apparatus) that detects a rotating angle (displacement) of the MF operating ring 108. When the user confirms the focus state of the object through the display unit 206 and rotates the MF operating ring 108, the lens microcomputer 101 reads the output signal out of the operating angle detector 109, drives the focus driving motor 104, and moves the focus lens 106 in the optical axis direction. When the operating angle detector 109 minutely detects a rotation of the MF operating ring 108, the user can control fine focusing and improve the operability of the MF mode. A detailed description will be given of the detection by the operating angle detector 109.

Figure 2A:
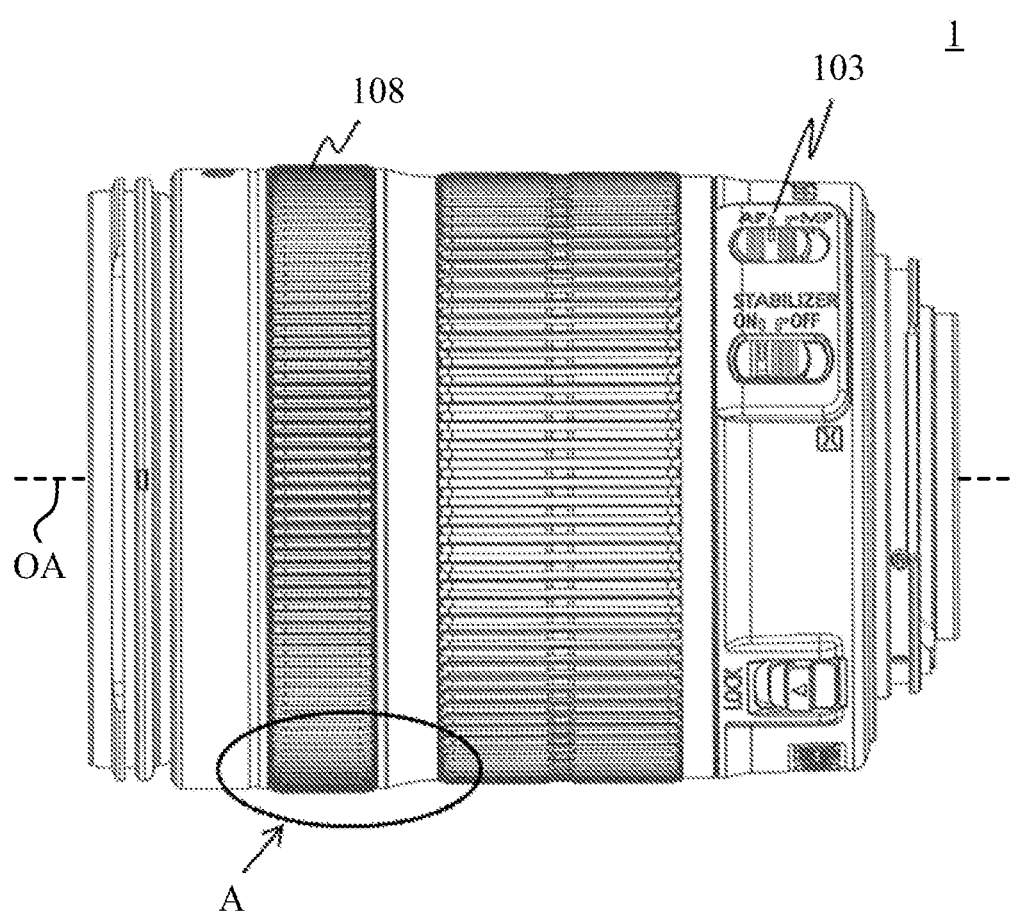
FIGS. 2A and 2B illustrate structures of an interchangeable lens according to first, second, and third embodiments.
Figure 2B:
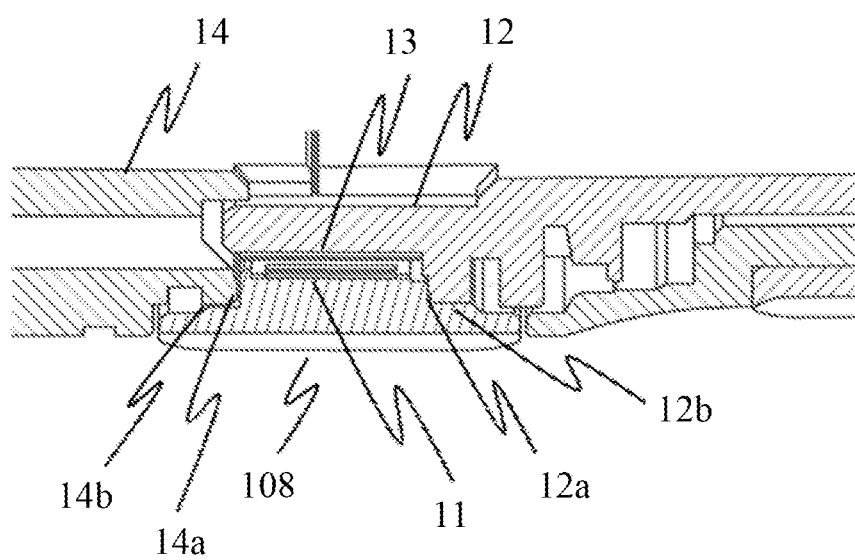

Referring now to FIGS. 2A and 2B, a description will be given of the structure of the interchangeable lens 1. FIGS. 2A and 2B illustrate the structure of the interchangeable lens 1. FIG. 2A is an overview of the interchangeable lens 1. As illustrated in FIG. 2A, the AF/MF switch 103 is disposed on the side surface of the rear end of the interchangeable lens 1 (right side in FIG. 2A). The rotatably supported MF operating ring 108 is disposed at the front end of the interchangeable lens 1 (left side in FIG. 2A).

FIG. 2B is an enlarged view of an eclipse A in FIG. 2A, and a sectional view of principal part around the MF operating ring 108. Reference numeral 11 denotes a movable electrode (second electrode). The movable electrode 11 is a conductive electrode integrated with the internal circumference wall coaxial with the rotation center axis of the MF operating ring 108. Reference numeral 12 denotes a guide cylinder (fixed member). Reference numeral 13 denotes a fixed electrode (first electrode) integrated with the guide cylinder 12 opposite to the movable electrode 11. Reference numeral 14 is a front frame integrated with the guide cylinder 12 in the unillustrated part. The MF operating ring 108 is held between the guide cylinder 12 and the front frame 14 with a predetermined aperture from front and back surfaces 12a and 14a along the optical axis OA, and can rotate at a fixed position by an engagement support between cylindrical surfaces 12b and 14b. This embodiment disposes a metal ring as a separate component for the movable electrode 11 that is a conductive electrode on the internal circumference wall in the MF operating ring 108, and this metal ring is integrated with the MF operating ring 108. The fixed electrode 13 has an electrode for the flexible substrate as a copper foil pattern and is fixed on the outer circumference wall of the guide cylinder 12 through an adhesive tape or adhesive agent. However, this embodiment is not limited to this example, and the following electrode pattern may be directly formed on the internal circumference wall in the MF operating ring 108 and the outer circumference wall on the guide cylinder 12 using the technology, such as plating, vacuum evaporation, and screen printing of a conductive material.

Figure 3A:
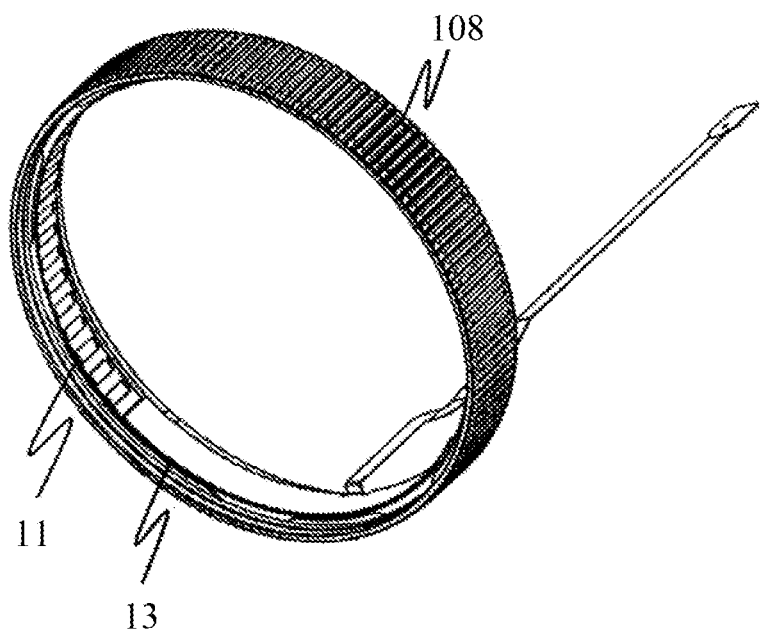
FIGS. 3A and 3B are exploded perspective views of a movable electrode and a fixed electrode according to the first, second, and third embodiments.
Figure 3B:
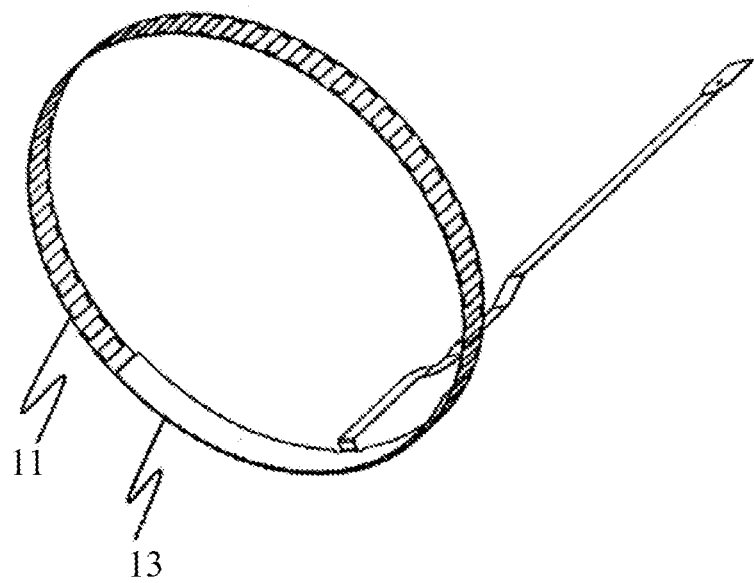

Referring now to FIGS. 3A and 3B, a description will be given of structures of the movable electrode 11 and the fixed electrode 13. FIGS. 3A and 3B are exploded perspective views of the movable electrode 11 and the fixed electrode 13. FIG. 3A illustrates a relationship among the movable electrode 11, the fixed electrode 13, and the MF operating ring 108. FIG. 3B omits the MF operating ring 108 from FIG. 3A. As illustrated in FIGS. 3A and 3B, the movable electrode 11 has a cylindrical shape in which a repetitive pattern having conductive electrode strips is connected across the entire circumference in a direction around the optical axis. The fixed electrode 13 is a flexible substrate having a finite angular range, faces the movable electrode 11, and includes a cylindrical shape coaxial with the movable electrode 11.

Figures 4A, 4B, 4C, 4D:
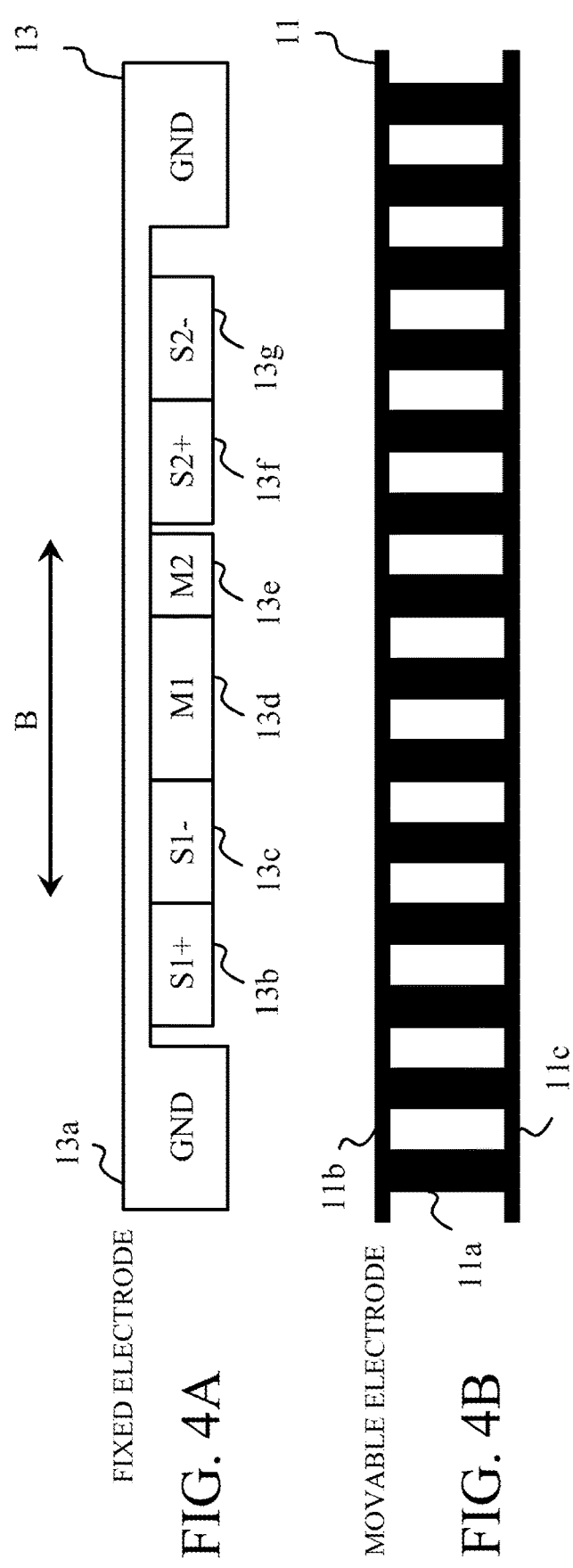
FIGS. 4A, 4B, 4C, and 4D are detailed views of the movable electrode and the fixed electrode for explaining a displacement detecting principal according to each embodiment.

Referring now to FIGS. 4A to 8C, a description will be given of a detection principal of the operating angle detector 109 configured to detect the rotating angle in the MF operating ring 108. For easy description and understanding, this embodiment uses a plane state developed in the rotating direction as the detecting direction. FIGS. 4A to 4D are views for explaining the detection principal, and detailed views of the movable electrode 11 and the fixed electrode 13. FIG. 4A is a plane view of the fixed electrode 13, FIG. 4B is a plane view of the movable electrode 11, and FIG. 4C is a plane view in which the fixed electrode 13 and the movable electrode 11 overlap each other. FIG. 4D illustrates the fixed electrode 13 and the movable electrode 11 viewed from a thickness direction orthogonal to the detection direction B (direction orthogonal to both a detection direction B and a length h direction). The direction illustrated by an arrow B in FIG. 4A is the detection direction (rotating direction).

Figure 5:
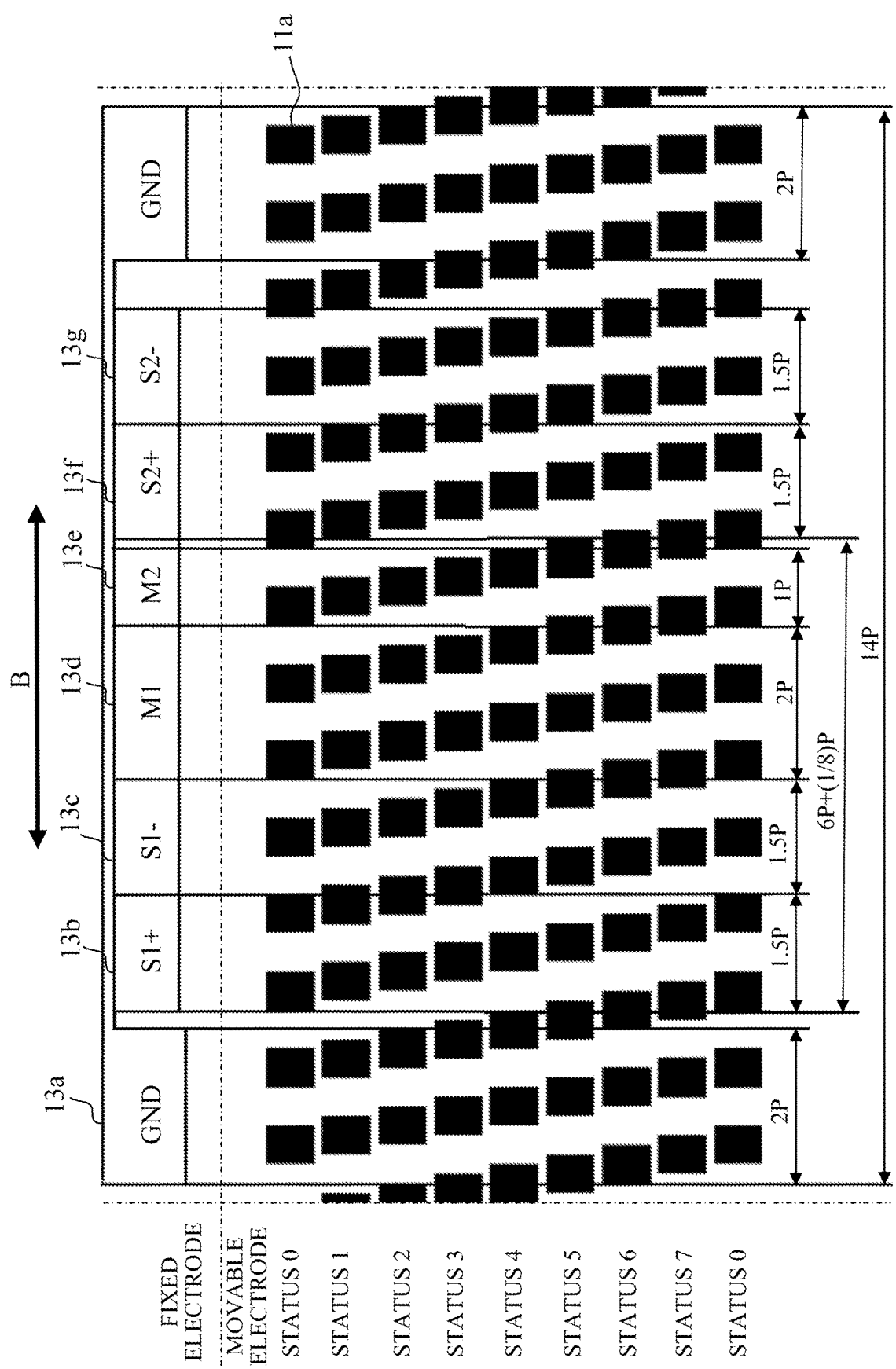
FIG. 5 illustrates a relationship between the fixed electrode and the movable electrode for explaining the displacement detecting principal according to each embodiment.

Referring now to FIG. 4A, a description will be given of the electrode pattern of the fixed electrode 13. Referring now to FIG. 5, a description will be given of a length of each electrode in the detection direction. As illustrated in FIG. 4A, the fixed electrode 13 includes a reference electrode 13a (GND electrode), detection electrodes 13b, 13c, 13d, 13e, 13f, and 13g. The detection electrodes 13b, 13c, 13d, 13e, 13f, and 13g are an S1+ electrode, an S1− electrode, an M1 electrode, an M2 electrode, an S2+ electrode, and an S2− electrode, respectively. FIG. 4A illustrates adjacent borders of the electrodes, but the adjacent electrodes are actually insulated with an aperture and each electrode is connected to a capacitance detecting circuit 16 (capacitance detector) illustrated in FIG. 6, which will be described later.

FIG. 4B is a developed view of the cylindrical movable electrode 11 illustrated in FIGS. 3A and 3B. A black area in the movable electrode 11 is a conductive electrode portion. Reference numeral 11a is a repetitive pattern electrode that serves to change a detection output, and reference numerals 11b and 11c are conductive electrodes that electrically connect the repetitive pattern electrode 11a. FIG. 4C illustrates the movable electrode 13 and the movable electrode 11 in an overlapping manner. In FIG. 4C, the movable electrode 11 is illustrated by a broken line. In FIG. 4C, a length h is a length of the overlapping area between the repetitive pattern electrode 11a and the detection electrodes 13b, 13c, 13d, 13e, 13f, and 13g in a direction orthogonal to the detection direction B, and this area forms a capacitance as a capacitor. In FIG. 4D, the length d is a gap (interval) for the capacitor. The capacitance C is proportional to the overlapping area between the opposite electrodes and the permittivity of the gap, and is in inverse proportion to the gap d. In other words, $C=\varepsilon \cdot S/d$ is established, where C is a capacitance, c is a permittivity, S is an area, and d is a gap.

Referring now to FIG. 5, a description will be given of a relationship between the fixed electrode 13 and the movable electrode 11. FIG. 5 explains the displacement detecting principal and illustrates a relationship between the fixed electrode 13 and the movable electrode 11 similar to FIGS. 4A to 4D. The upper side in FIG. 5 illustrates each electrode pattern of the fixed electrode 13 similar to FIG. 4A. The lower side in FIG. 5 illustrates the patterned electrode 11a in the movable electrode 11 in black. The patterned electrode 11a forms a capacitor in an area having a length h in which the detection electrodes 13b to 13g overlap one another as illustrated in FIG. 4C. FIG. 5 illustrates eight characteristic states while the movable electrode 11 moves from the left side to the right side in the detection direction B in order of the status 0 to 7 and 0. The movable electrode 11 and the fixed electrode 13 overlap each other and form a capacitor, as illustrated in FIG. 4C, but this embodiment uses an arrangement of the movable electrode 11 and the fixed electrode 13 with reference to FIG. 5 for easy understandings.

This embodiment assumes that P is a repetitive pitch of the repetitive pattern 11a as the electrode portion, and an electrode ratio is half in one pitch. In the following description, assume that one repetitive pattern electrode 11a illustrated in black has an area of "1" for convenience. A moving amount of the movable electrode 11 between statuses is (⅛)P, and the statuses 0 and 4 are different by a phase of 180° with respect to the pitch P.

The reference electrode 13a (GND electrode) in the fixed electrode 13 mainly overlap the repetitive pattern electrode 11a in the movable electrode 11 with left and right lengths of 2P or a total length of 4P. Part of the reference electrode 13a (GND electrode) overlaps the repetitive pattern electrode 11a in the area over a length of 10P between left and right lengths of 2P in the length of 14P. In other words, the reference electrode 13a has a length of L×P (L: natural number) in the detection direction B, and L is 4 (left and right lengths of 2P×2=4P) or 14 (overall length of 14P) in this embodiment.

A length of the reference electrode 13a (GND electrode) is a multiple of the pitch P. Therefore, an overlapping area between the reference electrode 13a (GND electrode) and the electrode portion (repetitive pattern electrode 11a) of the movable electrode 11 has always a constant area. When the gap d is constant, the capacitance C is constant. The detection electrode 13b (S1+ electrode) and the detection electrode 13c (S1− electrode) both have a length of 1.5P and they form a phase difference of 180°. In other words, this corresponds to M of 1 in a length expressed by an expression of (M+0.5)×P (M is 0 or natural number). An overlapping area between the detection electrode 13b (S1+ electrode) and the repetitive pattern electrode 11a is "2" in the status 0 and "1" in the status 4 and returns to the area "2" in the status 0 via the status 7. This change will be repeated hereinafter.

On the other hand, the detection electrode 13c (S1− electrode) has a phase difference of 180° relative to the detection electrode 13b (S1+ electrode). Hence, the overlapping area between the detection electrode 13c (S1− electrode) and the repetitive pattern electrode 11a is "1" in the status 0 and "2" in the status 4. Hence, the capacitance C inversely changes for the detection electrode 13b (S1+ electrode) and the detection electrode 13c (S1− electrode). In this embodiment, the detection electrode 13b (S1+ electrode) and the detection electrode 13c (S1− electrode) are a pair of displacement detecting electrodes (one displacement detecting pair). A changing amount of the overlapping area between the detection electrode 13b (S1+ electrode) and the detection electrode 11a (S1− electrode) depends on the movement of the movable electrode 11, and the capacitance C linearly changes. This is true of the detection electrode 13c (S1− electrode).

Each of the detection electrode 13f (S2+ electrode) and the detection electrode 13g (S2− electrode) has a length expressed by (M+0.5)×P (M is 0 or natural number), and they form a pair of displacement detecting electrodes (one displacement detecting electrode pair) having a phase difference of 180°. For the detection electrode 13f (S2+ electrode) and the detection electrode 13g (S2-electrode), the above M is 1 similar to the detection electrode 13b (S1+ electrode) and the detection electrode 13c (S1− electrode).

These two pairs of displacement detecting electrodes (two displacement detecting pairs) have a phase difference of 6P+(⅛)P in the detection direction B when converted into the pitch P as illustrated in FIG. 5, and the capacitance C changes by (⅛)P. In other words, the overlapping area between the detection electrode 13f (S2+ electrode) and the repetitive pattern electrode 11a is "2" in the status 1 and "1" in the status 5. On the other hand, the detection electrode 13g (S2− electrode) has a phase difference of 180° relative to the detection electrode 13f (S2+ electrode). Thus, the overlapping area between the detection electrode 13f (S2+ electrode) and the detection electrode 13g (S2− electrode) in the same status have an inverse relationship.

The detection electrode 13d (M1 electrode) has a length of 2P. The overlapping area between the detection electrode 13d (M1 electrode) and the repetitive pattern electrode 11a is always "2" from the status 0 to the status 7 and does not change. The detection electrode 13e (M2 electrode) has a length of 1P. The overlapping area between the detection electrode 13e (M2 electrode) and the repetitive pattern electrode 11a is always "1" from the status 0 to the status 7 and does not change. The detection electrode 13e (M2 electrode) and the detection electrode 13d (M1 electrode) are a pair of reference electrodes (one reference electrode pair) having lengths of N×P and (N+Q)×P (N and Q are natural numbers), and both N and Q are 1 in this embodiment.

Figure 6:
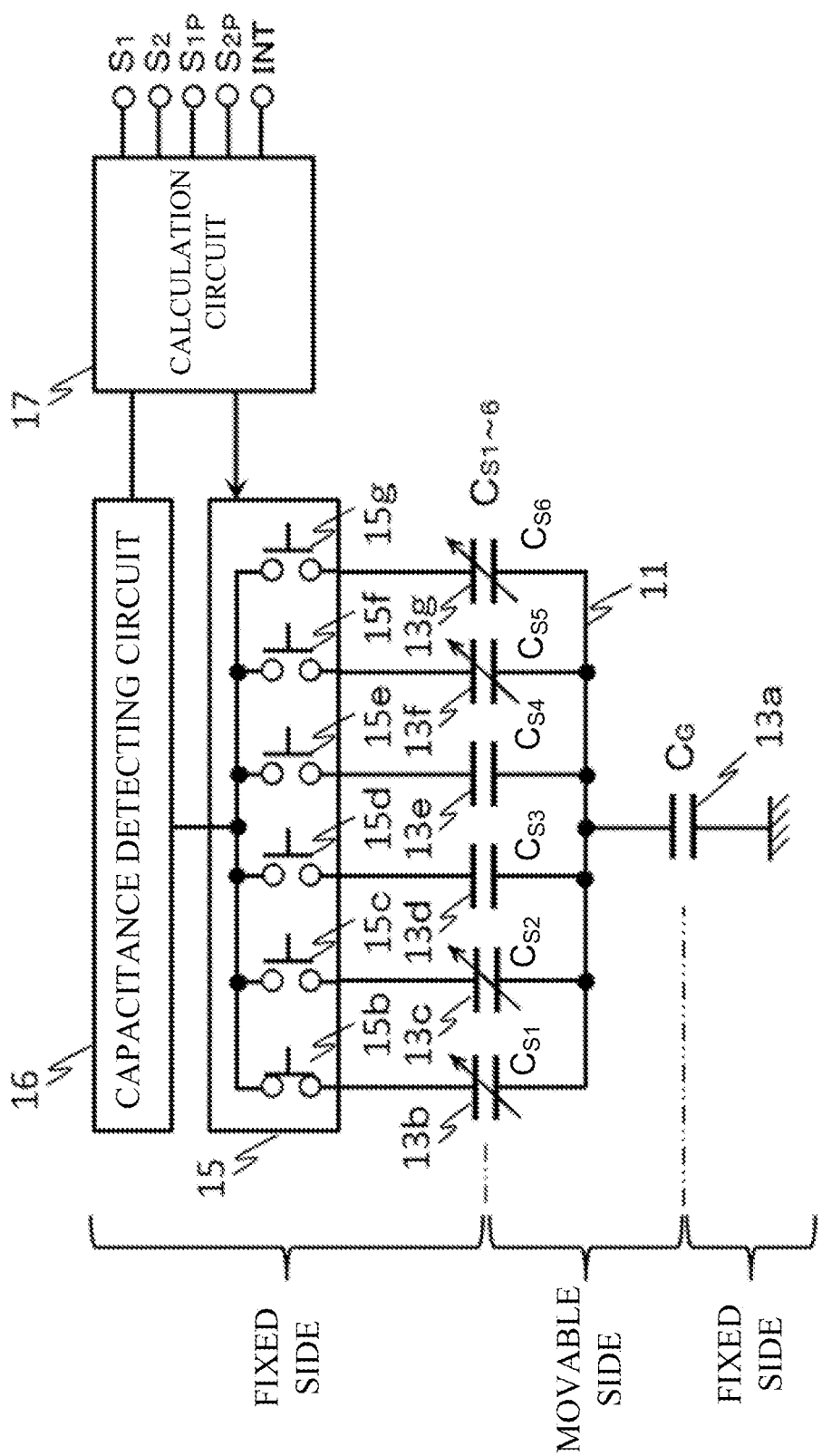
FIG. 6 illustrates equivalent circuits and signal processing blocks of the fixed electrode and the movable electrode for explaining the displacement detecting principal according to each embodiment.

Referring now to FIG. 6, a description will be given of an equivalent circuit of a capacitor according to this embodiment that includes the fixed electrode 13 and the movable electrode 11 and a signal processor. FIG. 6 is the equivalent circuit view of the capacitor that includes the fixed electrode 13 and the movable electrode 11 and the signal processing block diagram.

The fixed electrode 13 includes the reference electrode 13a (GND electrode), the detection electrode 13b (S1+ electrode), the detection electrode 13c (S1− electrode), the detection electrode 13d (M1 electrode), the detection electrode 13e (M2 electrode), the detection electrode 13f (S2+ electrode), and the detection electrode 13g (S2− electrode). As illustrated in FIG. 6, each electrode in the fixed electrode 13 constitutes the capacitor with the movable electrode 11. Herein, assume that $C_G$, $C_{S1}$, $C_{S2}$, $C_{S3}$, $C_{S4}$, $C_{S5}$, and $C_{S6}$ are capacitances of the capacitors that include the reference electrode 13a and the detection electrodes 13b to 13g. When the gap d is constant, the capacitances $C_{S1}$, $C_{S2}$, $C_{S5}$, and $C_{S6}$ are variable capacitors that change as the movable electrode 11 moves. The capacitances $C_G$, $C_{S3}$, and $C_{S4}$ are capacitors with a fixed value that does not change as the movable electrode 11 moves.

Reference numeral 15 denotes an analog switch array, reference numeral 16 denotes a capacitance detecting circuit, and reference numeral 17 denotes a calculation circuit (detector or signal processor). The analog switch array 15 includes analog switches 15b, 15c, 15d, 15e, 15f, and 15g. In this embodiment, the analog switches 15b to 15g are connected in series with the detection electrodes 13b to 13g. The calculation circuit 17 sets the analog switches 15b to 15g one by one to a short-circuit state in a time-division manner. The capacitance detecting circuit 16 detects the capacitances (combined capacities) between the capacitance $C_G$, and each of capacitances $C_{S1}$, $C_{S2}$, $C_{S3}$, $C_{S4}$, $C_{S5}$, and $C_{S6}$ connected in series with the capacitance $C_G$. The calculation circuit 17 outputs signals $S_1$, $S_2$, $S_{1P}$, $S_{2P}$, and INT based on the detection result by the capacitance detecting circuit 16. A detailed description of these signals will be given later.

Figure 7A:
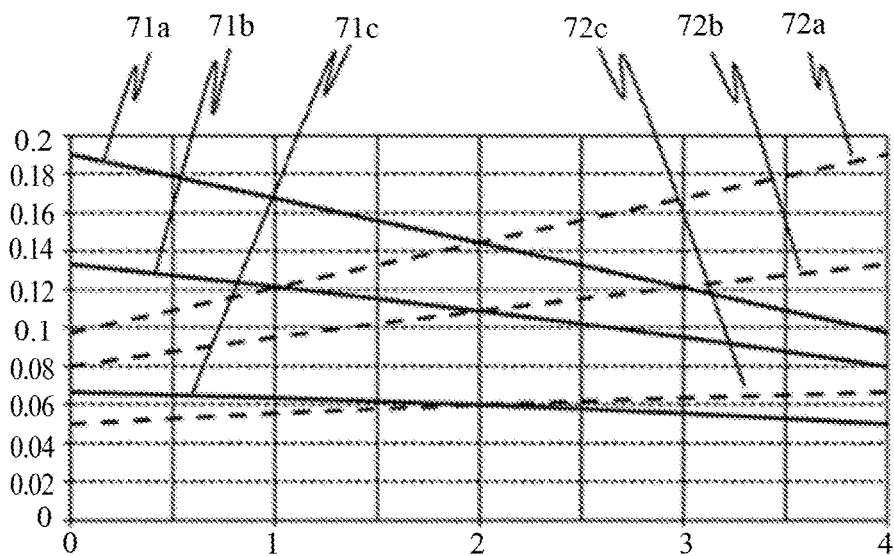
FIGS. 7A, 7B, and 7C are graphs illustrating a signal based on a capacitance formed by the fixed electrode and the movable electrode according to each embodiment.
Figure 7B:
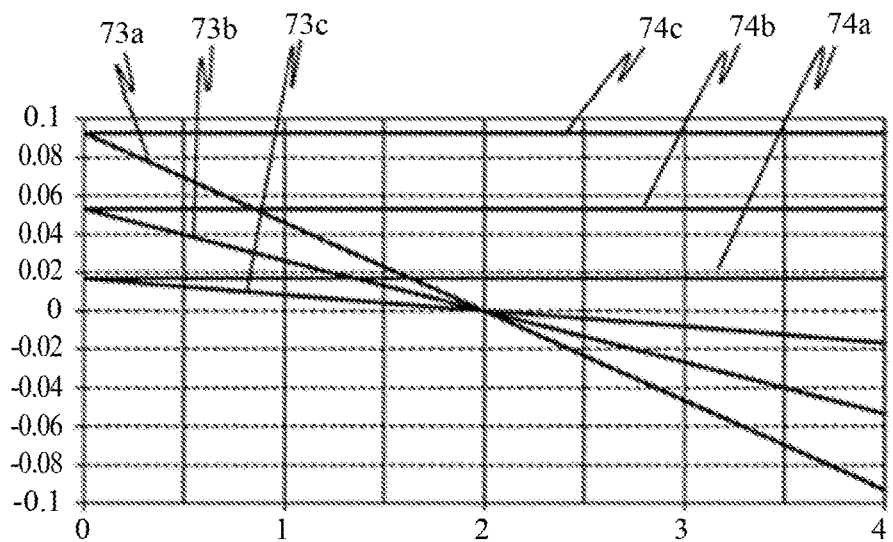
Figure 7C:
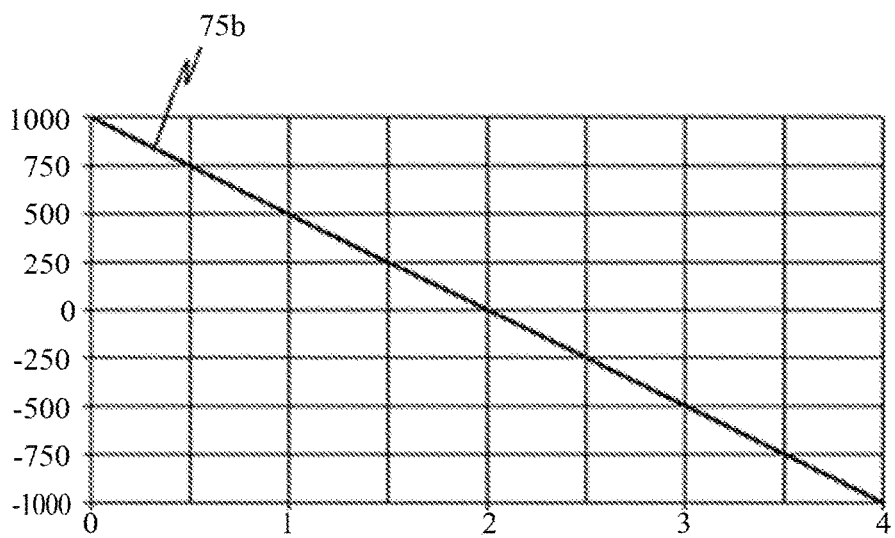

Referring now to FIGS. 7A to 7C, a description will be given of the output signal based on the capacitance of the capacitor formed by the fixed electrode 13 and the movable electrode 11 (output signal of the displacement detecting electrode pair and the reference electrode pair). FIGS. 7A to 7C are graphs illustrating the output signals based on the capacitance formed by the fixed electrode 13 and the movable electrode 11. FIGS. 7A to 7C particularly illustrate the capacitances of the capacitors corresponding to the detection electrode 13b (S1+ electrode), the detection electrode 13c (S1− electrode), the detection electrode 13d (M1 electrode), and the detection electrode 13e (M2 electrode). In FIGS. 7A to 7C, the abscissa axis represents the statuses 0 to 4 described with reference to FIG. 5, and the ordinate axis represents the capacitance (combined capacitance (FIG. 7A)), the differential signal (FIG. 7B), and the normalized signal (FIG. 7C). The capacitance of each capacitor is 0.1 pF with the gap d and the area of "1" for convenience in FIG. 5. FIGS. 7A and 7B three types of capacitances $C_G$ of 0.1 pF, 0.4 pF (corresponding to the length of 4P illustrated in FIG. 5), and 4.0 pF.

FIG. 7A is a graph representing a combined capacitance $C_{G\_S1}$ between the capacitances $C_G$ and $C_{S1}$ and a combined capacitance $C_{G\_S2}$ between the capacitances $C_G$ and $C_{S2}$. An inverse of each of the combined capacities $C_{G\_S1}$ and $C_{G\_S2}$ of the two capacitors connected in series is equal to a sum of inverses of these capacitances. In other words, $1/C_{G\_S1}=1/C_G+1/C_{S1}$ and $1/C_{G\_S2}=1/C_G+1/C_{S2}$ are established. For example, when $C_G$=0.4 pF and $C_{S1}$=0.2 pF (in the status 0 in FIG. 5), $C_{G\_S1}$=0.133 pF is established. When $C_G$=0.4 pF and $C_{S1}$=0.1 pF (in the status 4 in FIG. 5), $C_{G\_S1}$=0.080 pF is established. This corresponds to a combined capacitance illustrated by a solid line 71b in FIG. 7A.

In FIG. 7A, solid lines 71a, 71b, and 71c represent a combined capacitance between the detection electrode 13b (S1+ electrode) and the reference electrode 13a (GND electrode). The solid line 71a represents $C_G$=4.0 pF, the solid line 71b represents $C_G$=0.4 pF, and the solid line 71c represents $C_G$=0.1 pF. In FIG. 7A, broken lines 72a, 72b, and 72c represent a combined capacitance between the detection electrode 13c (S1− electrode) and the reference electrode 13a (GND electrode). Since the detection electrode 13c (S1− electrode) has a phase difference of 180° relative to the detection electrode 13b (S1+ electrode), the broken lines 72a, 72b, and 72c are graphs made by laterally inverted from the solid lines 71a, 71b, and 71c. As understood from FIG. 7A, the combined capacitance of the capacitors connected in series mainly depends on a smaller capacitance. Thus, the combined capacitance reflects changes of capacitances $C_{S1}$ and $C_{S2}$ in the detection electrode 13b (S1+ electrode) or the detection electrode 13c (S1− electrode) of the variable capacitor as the capacitance $C_G$ of the reference electrode 13a (GND electrode) becomes larger, and provides a large capacitance change. As illustrated in FIG. 5, a length of 10P in an overlapping area between the repetitive pattern electrode 11a and the reference electrode 13a (GND electrode) is provided to increase the capacitance $C_G$.

FIG. 7B is a graph illustrating a differential output (differential signal) of each of the displacement detecting electrode pair and the reference electrode pair. In FIG. 7B, solid lines 73a, 73b, and 73c represent a differential signal between the combined capacities $C_{G\_S1}$ and $C_{G\_S2}$. In other words, the solid lines 73a, 73b, and 73c correspond to the broken line 72a subtracted from the solid line 71a, the broken line 72b subtracted from the solid line 71b, and the broken line 72c subtracted from the solid line 71c. In addition, in FIG. 7B, solid lines 74a, 74b, and 74c are differential signals between the detection electrode 13d (M1 electrode) and the detection electrode 13e (M2 electrode) and correspond to the capacitance $C_G$ similar to FIG. 7A. Since $C_{S3}$=0.2 pF and $C_{S4}$=0.1 pF, the solid lines 74a, 74b, and 74c have constant values that accord with the maximum values of the solid lines 73a, 73b, and 73c. The calculation circuit 17 illustrated in FIG. 6 provides these differential calculations.

A solid line 75b in FIG. 7c is a normalized signal (displacement signal) obtained by dividing the solid line 73b in FIG. 7B by the solid line 74b, by multiplying the resultant value by 1000, and by normalizing the value. The maximum value, the minimum value, and the intermediate value (0) obtained by dividing the solid line 73a in FIG. 7B by the solid line 74a, and by dividing the solid line 73c by the solid line 74c are equal to one another through the differential calculation. However, these values may have slight nonlinearities. The actual numerical values have the largest nonlinearity in the status 1 (and the status 3), and when the capacitance $C_G$ is 0.1 pF, 0.4 pF, and 4.0 pF, they are −3.03%, −0.62%, and −0.01% for the true value of 500. FIG. 7C illustrates the capacitance $C_G$ of 0.4 pF, but another case illustrated in the same graph will almost overlap this graph and a display of the other case may be omitted. The normalization illustrated in FIG. 7C provides almost the same characteristic irrespective of the capacitance $C_G$. At this time, since a raw output increases, the S/N ratio (noise to signal) improves, and the resolution improves by maintaining large the capacitance $C_G$. The calculation circuit 17 illustrated in FIG. 6 provides this normalization calculation.

FIGS. 8A to 8C are graphs representing the displacement signals (output signals of the two displacement detecting electrode pairs) based on the capacitances formed by the fixed electrode 13 and the movable electrode 11. FIG. 8A illustrates results of the differential calculation and normalization calculation illustrated in FIGS. 7B and 7C to capacities formed by the first displacement detecting electrode pair that includes the detection electrodes 13b and 13c and the second displacement detecting electrode pair that includes the detection electrodes 13f and 13g. The abscissa axis in FIG. 8A represents a status illustrated in FIG. 5 or a range of two repetitions. The ordinate axis in FIG. 8A represents a value corresponding to the normalized capacitance change.

In FIG. 8A, a solid line 81 represents a displacement signal $S_1$ based on the first displacement detecting electrode pair. A broken line 82 represents a displacement signal $S_2$ based on the second displacement detecting electrode pair. The displacement signals $S_1$ and $S_2$ are output from the calculation circuit 17, as illustrated in FIG. 6. The displacement signal $S_2$ has a phase difference of (⅛)P (for one status of 45°) relative to the displacement signal $S_1$. A solid line 83 represents an intermediate value (0), a broken line 84 represents a positive threshold, and a broken line 85 represents a negative threshold.

FIG. 8B is a graph representing a value obtained by discretizing the displacement signals $S_1$ and $S_2$ illustrated by the solid line 81 and the broken line 82 in FIG. 8A with the positive and negative thresholds illustrated by the broken lines 84 and 85. In FIG. 8B, part larger than the positive threshold illustrated by the broken line 84 is "H," part smaller than the negative threshold (broken line 85) illustrated by the broken line 85 is "L," and part between both thresholds is "M." A solid line 86 represents a displacement signal $S_{1P}$ obtained by discretizing the displacement signal $S_1$, and a broken line 87 represents the displacement signal $S_{2P}$ obtained by discretizing the displacement signal $S_2$. The displacement signals $S_{1P}$ and $S_{2P}$ are output from the calculation circuit 17 as illustrated in FIG. 6. FIG. 8C is a table illustrating the displacement signals $S_{1P}$ and $S_{2P}$ illustrated in FIG. 8B for each status. Since the same pattern does not appear in eight states from the status 0 to the status 7, this embodiment can separate and detect the angle for each (⅛)P.

In this embodiment, when the displacement signals $S_1$ and $S_2$ cross the positive threshold (broken line 84) or the negative threshold (broken line 85) illustrated in FIG. 8A in a direction from top to down or down to top, the calculation circuit 17 may be set to output the interrupt signal INT. Thereby, the lens microcomputer 101 illustrated in FIG. 1 is interrupted so as to enable the lens microcomputer 101 to easily recognize the rotating angle and the rotating direction of the MF operating ring 108 based on the discretized displacement signals $S_{1P}$ and $S_{2P}$. In addition, the lens microcomputer 101 continuously reads the displacement signals $S_1$ and $S_2$ out of the calculation circuit 17, and thereby accurately detects the rotation of the MF operating ring 108, improving the operability of the MF mode.

When the output signal that linearly changes with the positive and negative thresholds is discretized into three stages of "H," "M," and "L," a phase difference between the two displacement signals is set to (⅛)P or 45° so as to provide uniform pulse switching (a significant phase difference of 45°). In addition, when three displacement detecting electrode pairs are discretized into three stages, each phase difference is set to (1/12)P or 30° so as to provide a uniform pulse interval and twelve different statuses. In this case, 30° and 60° are significant phase differences. While this embodiment describes three-stage discretization, for the two-phase signal in which one threshold is used for the two-stage discretization of "H" and "L," (¼)P or 90° is a phase difference for four different uniform statuses. Furthermore, (⅙)P or 60° is a phase difference for the six different uniform statuses in the three-phase signal and 60° and 120° are significant phase differences.

This embodiment obtains the capacitance information from the plurality of displacement detecting electrode pairs and the reference electrode pair so as to detect the displacement through the differential calculation. Hence, a displacement can be more stably detected even with a stray capacitance and a parasitic capacitance between electrodes and in close objects. Even when the surrounding environment changes or a gap fluctuates between the movable electrode and the fixed electrode, a displacement can be stably detected by the normalization calculation illustrated in FIG. 7C with the outputs from the reference electrode pair.

This embodiment can thus detect a displacement by detecting and calculating the capacitance between the opposing electrodes. For example, this embodiment can reduce a power consumption without a sensor that requires a comparatively large current consumption like the photo-interrupter. The following embodiments will describe a relationship between the fixed electrode and the movable electrode in detail based on the above detection principal so as to improve the displacement detecting accuracy.

First Embodiment

Figure 9:
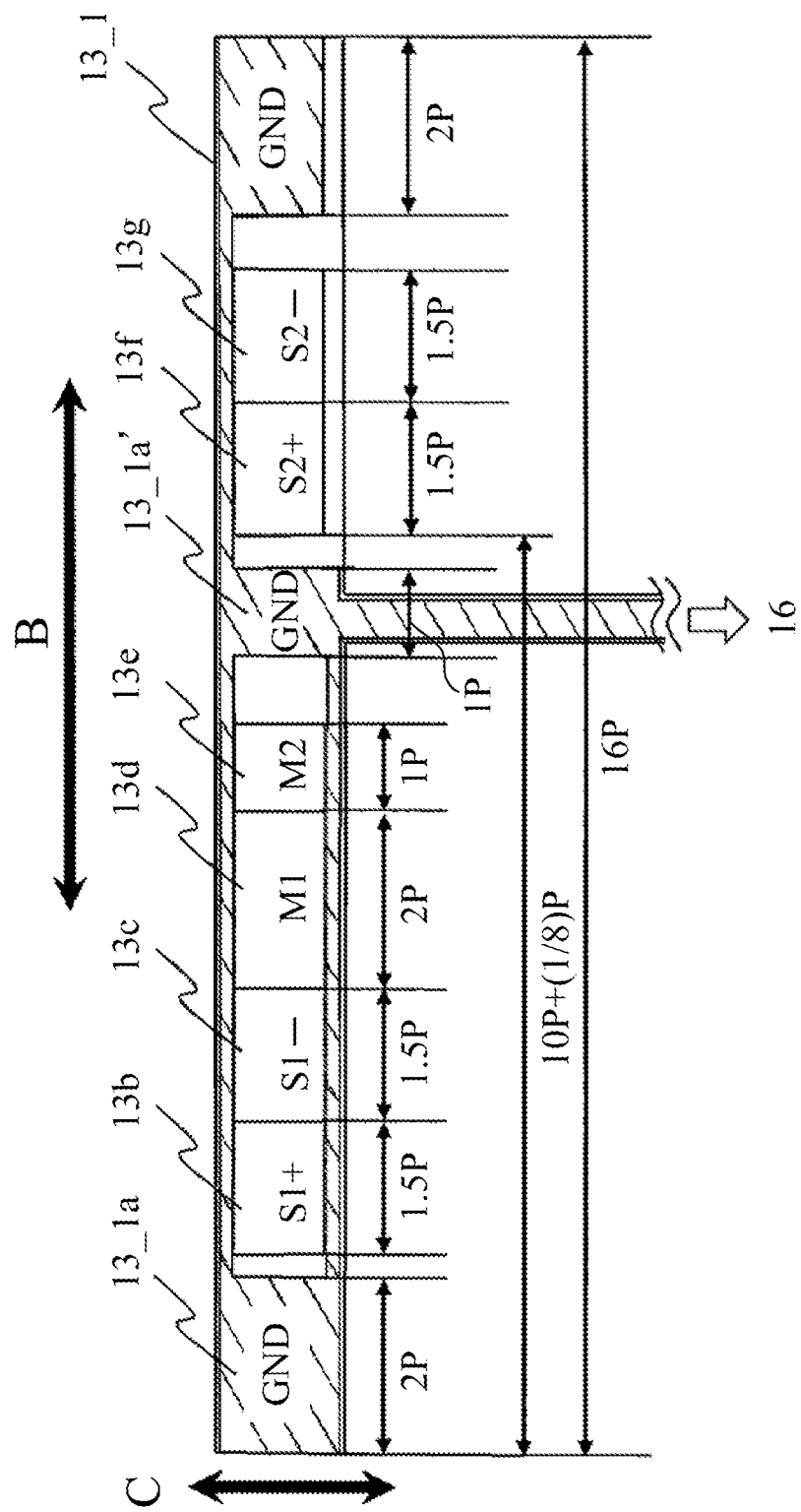
FIG. 9 is a developed view of a fixed electrode according to a first embodiment.
Figure 10:
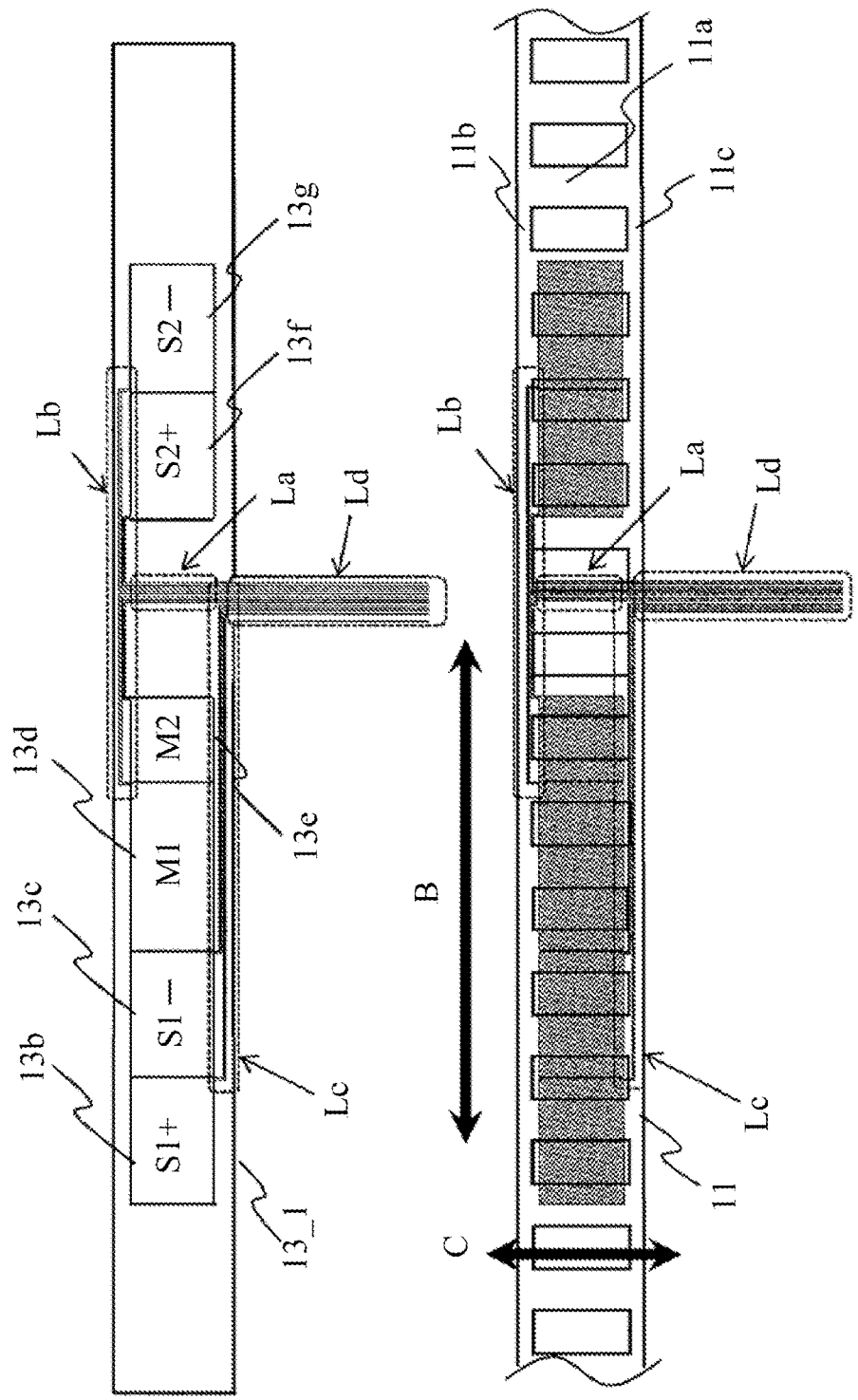
FIGS. 10A and 10B illustrate wirings in detection electrodes and a movable electrode according to the first embodiment.

Referring now to FIGS. 9, 10A, and 10B, a description will be given of a first embodiment of the present invention. FIG. 9 is a plane view of the fixed electrode 13_1 viewed from the movable electrode 11 side according to this embodiment. FIGS. 10A and 10B are plane views of a relationship between the movable electrode 11 and the wirings La to Ld in the detection electrodes 13b to 13g in the fixed electrode 13_1.

The fixed electrode 13_1 is a two-layer flexible substrate, such as a double-sided flexible substrate. The reference electrode 13_1a (GND electrode) is provided to one layer (first layer) on the movable electrode side. The detection electrodes 13b to 13g are provided to another layer (second layer) opposite to the movable electrode 11 with respect to the reference electrode 13_1a. Each electrode in the fixed electrode 13_1 is insulated with a slight aperture and connected to the capacitance detecting circuit 16.

As illustrated in FIG. 9, the fixed electrode 13_1 has an electrode 13_1a' as part of the reference electrode 13_1a between the detection electrodes 13e and 13f in the detection direction B. Hence, the fixed electrode 13_1 has a reference electrode area wider than that of the fixed electrode 13 by the electrode portion 13_1a'. As described above, the capacitance $C_G$ of the reference electrode 13_1a (GND electrode) increases in proportion to the area, and the capacitances (outputs) of the detection electrodes 13b to 13g as the variable capacitors increase and the S/N (noise to signal) ratio and the resolution improve. The length of the reference electrode 13_1a in the detection direction B is 5 (a sum of 1P between the left and right lengths 2P×2) or 16 (overall length 16P) as a multiple of the pitch P. The overlapping area between the reference electrode 13a1a and the electrode portion (repetitive pattern electrode 11a) of the movable electrode 11 is always constant and thus the fixed electrode 13_1 is disposed in accordance with the above detection principal.

Next follows a description of a structure for restraining the parasitic capacitance that causes noises. FIG. 10A illustrates the detection electrodes 13b to 13g arranged in the one layer opposite to the movable electrode 11 with respect to the reference electrode 13_1a, and the wirings La to Ld connected to the capacitance detecting circuit 16 from each detection electrode. In this embodiment, the wirings La to Ld are formed in the same second layer as the detection electrodes 13b to 13g. FIG. 10B illustrates the movable electrode 11 overlapping FIG. 10A, and hatches the detection electrodes 13b to 13g. FIG. 10B illustrates a relationship among the detection electrodes 13b to 13g, the wirings La to Ld connected from each detection electrode to the capacitance detecting circuit 16, and the movable electrode 11.

In the gap direction (direction vertical to the paper in FIG. 10B), the wiring La faces the repetitive pattern electrode 11a in the movable electrode 11, the wiring Lb faces the conductive electrode 11b in the movable electrode 11, and the wiring Lc faces the conductive electrode 11c in the movable electrode 11. As described above, the operating angle detector 109 detects the displacement as the capacitance of the capacitor changes generated by the electrostatic coupling between the repetitive pattern electrode 11a in the movable electrode 11 and the detection electrodes 13b to 13g. Herein, the electrostatic coupling is a phenomenon that causes a stray capacity (capacitor) between a current flowing conductor and another spatially separated conductor and induces the voltage. Hence, when the wirings La to Lc in the detection electrodes 13b to 13g and the movable electrode 11 are electrostatically coupled to each other and generate the parasitic capacitance, the parasitic capacitance causes the noises and affects the detected capacitance (or the parasitic capacitance is added to the capacitance). In particular, when the wiring La is electrostatically coupled with the pattern 11a in the repetitive movable electrode 11, the detected parasitic capacity changes according to the position of the movable electrode 11 and it is thus difficult to restrain the parasitic capacity only through the offset processing.

Accordingly, the wirings La to Lc (part in the wirings that faces the movable electrode 11) face the movable electrode 11 via the reference electrode 13_1a in the gap direction in which the movable electrode 11 faces the fixed electrode 13_1. In other words, the wirings La to Lc are electrostatically coupled with the reference electrode 13_1a so as to restrain the parasitic capacitance that causes noises. Moreover, the wiring Ld that does not face the movable electrode 11 (part in the wiring that does not face the movable electrode 11) is also electrostatically coupled with the reference electrode 13_1a. Thereby, when an object (conductor), such as a finger, approaches from the outside of the interchangeable lens 1, this embodiment prevents the capacitor or the parasitic capacitance between the wiring Ld and the conductor and restrains both internal and external noises.

As understood from FIGS. 9, 10A and 10B, parts of the wirings Lb and Lc expose from the reference electrode 13_1a in this embodiment, and the wirings Lb and Lc do not perfectly face the movable electrode 11 via the reference electrode 13_1a. This is due to the following reasons. For the fixed electrode as a two-layer flexible substrate, the wirings can be perfectly covered with the reference electrode 13_1a in the direction C orthogonal to the moving direction B by expanding the reference electrode 13_1a and by putting the reference electrode 13_1a on the detection electrodes 13b to 13g. However, this overlap amount generates the parasitic capacitance between the reference electrode 13_1a and the detection electrodes 13b to 13g. Moreover, the detection electrodes 13b to 13g face the repetitive pattern electrode 11a by the overlap amount, reduce the electrostatic coupling area, and output a smaller capacitance.

The detection electrodes 13b to 13g do not contain the reference electrode 13_1a in the gap direction, and are opposite to the repetitive pattern portion 11a in the movable electrode 11. Thus, as described above, the movable capacitor can be formed in accordance with the position of the movable electrode.

This embodiment thus comprises the fixed electrode 13_1 of the two-layer flexible substrate, such as the double-sided flexible substrate, provides the expanded reference electrode 13_1a to one layer on the movable electrode 11 side, and arranges the detection electrodes 13b to 13g opposite to the movable electrode 11 with respect to the reference electrode 13_1a. Moreover, this embodiment electrostatically couples the wirings La to Ld in the detection electrodes 13b to 13g with the movable electrode 11. This configuration can make larger the capacitance $C_G$, restrain the parasitic capacitance between the wirings La to Lc and the movable electrode 11 and the parasitic capacitance between the wiring Ld and the external conductor, and provide a low power consumption, a high resolution, and an accurate displacement detection with restrained noises.

Figure 15A:
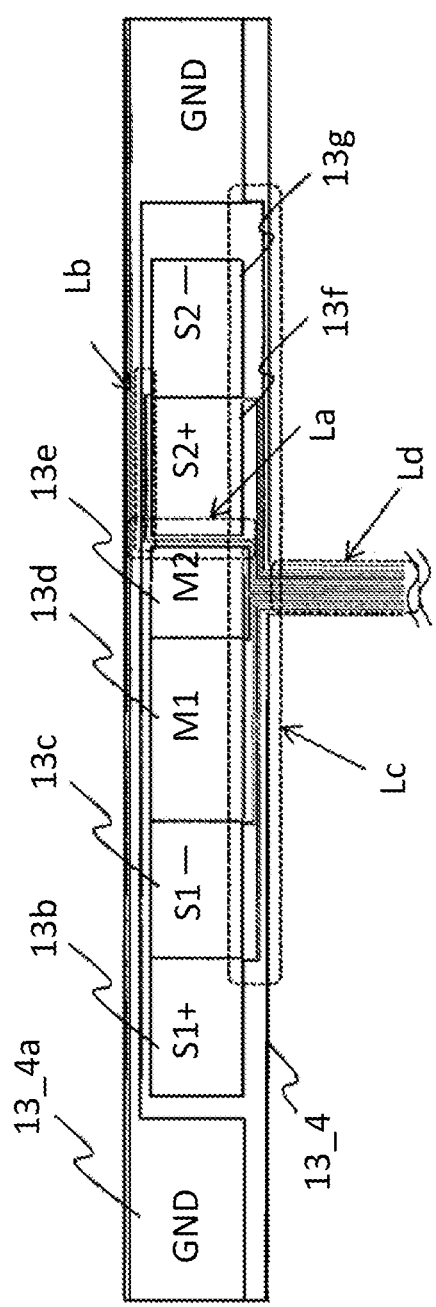
FIGS. 15A and 15B illustrate wirings in detection electrodes and a movable electrode according to a comparative example.
Figure 15B:
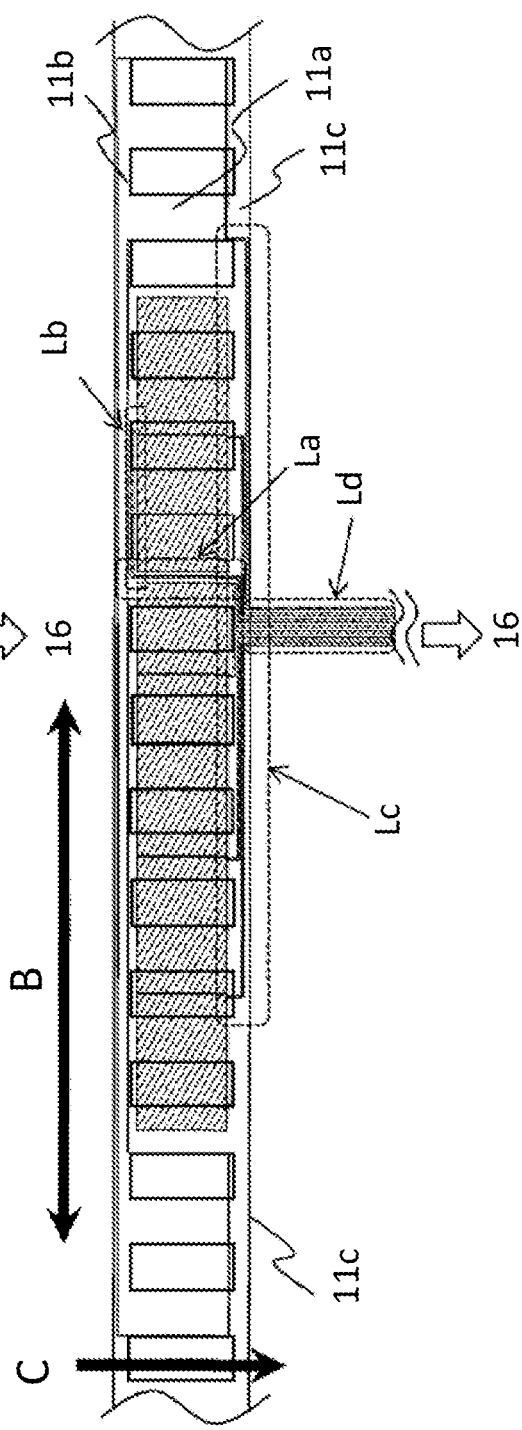

Referring now to FIGS. 15A and 15B, a description will be given of a fixed electrode 13_4 as a comparative example which does not apply this embodiment. The fixed electrode 13_4 is a one-layer flexible substrate. FIG. 15A illustrates the reference electrode 13_4a, the detection electrodes 13b to 13g, and the wirings La to Ld connected to each detection electrode and the capacitance detecting circuit 16. FIG. 15B illustrates the movable electrode 11 overlapping FIG. 15A, and hatches the detection electrodes 13b to 13g.

Since the fixed electrode 13_4 is a one-layer flexible substrate, no electrostatic coupling occurs between the wirings La to Ld and the reference electrode 13_4a in the gap direction, and the parasitic capacitance that causes noises is generated between the movable electrode 11 and the wirings La to Ld. The wiring Lc may be moved in the direction C that is orthogonal to the moving direction B and serves as a drawing direction of the flexible substrate, and the wiring may be disposed at a position that does not face the movable electrode 11 in the gap direction. However, the fixed electrode 13_4 extending in the direction C is not suitable for the miniaturization. For a high resolution and an accurate displacement detection in the limited space of the interchangeable lens 1, as in the fixed electrode 13_1 according to this embodiment, the two-layer flexible substrate, the expanded substrate electrode portion, and the electrostatic coupling between the wiring and the base electrode segment are effective.

Second Embodiment

Figure 11:
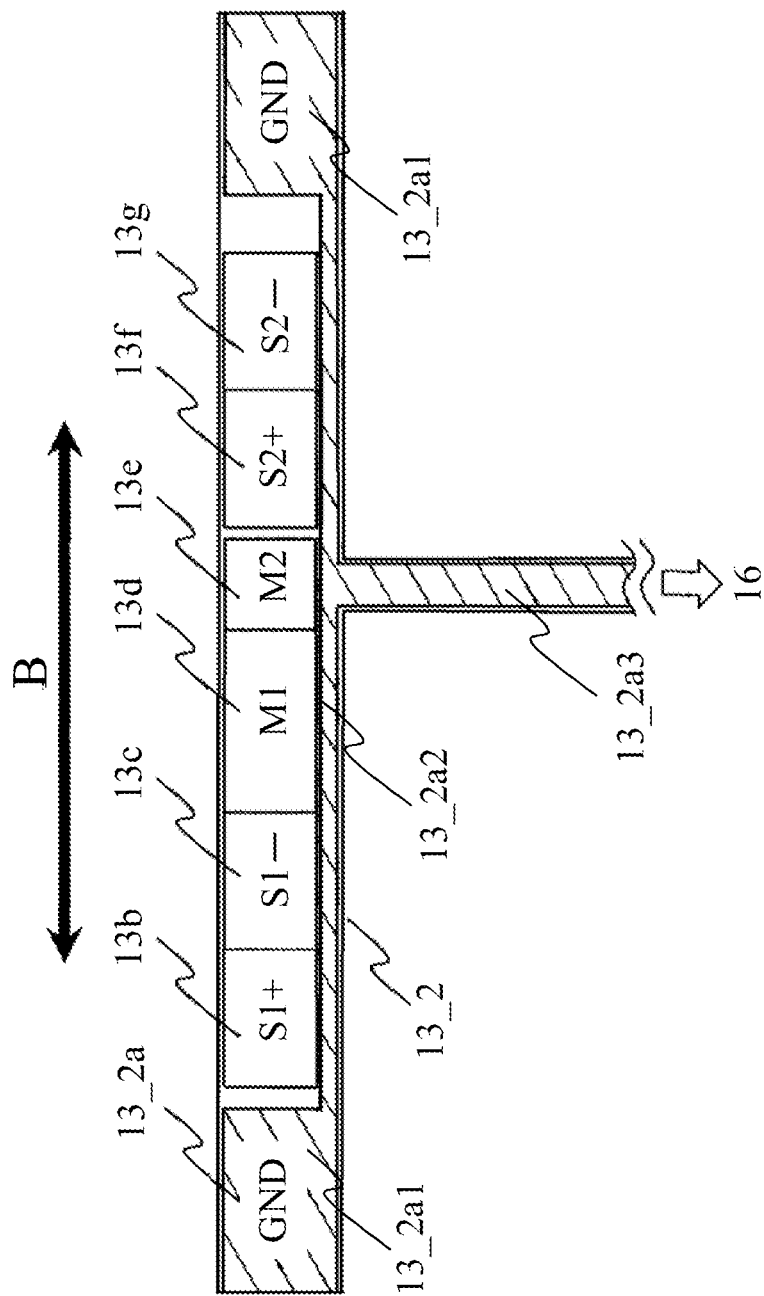
FIG. 11 is a developed view of a fixed electrode according to a second embodiment.
Figure 12A:
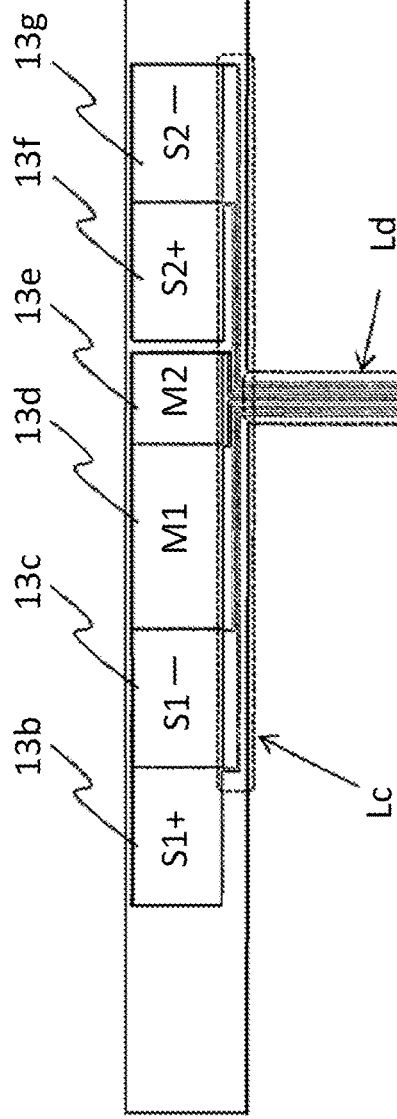
FIGS. 12A and 12B illustrate wirings in detection electrodes and a movable electrode according to the second embodiment.
Figure 12B:
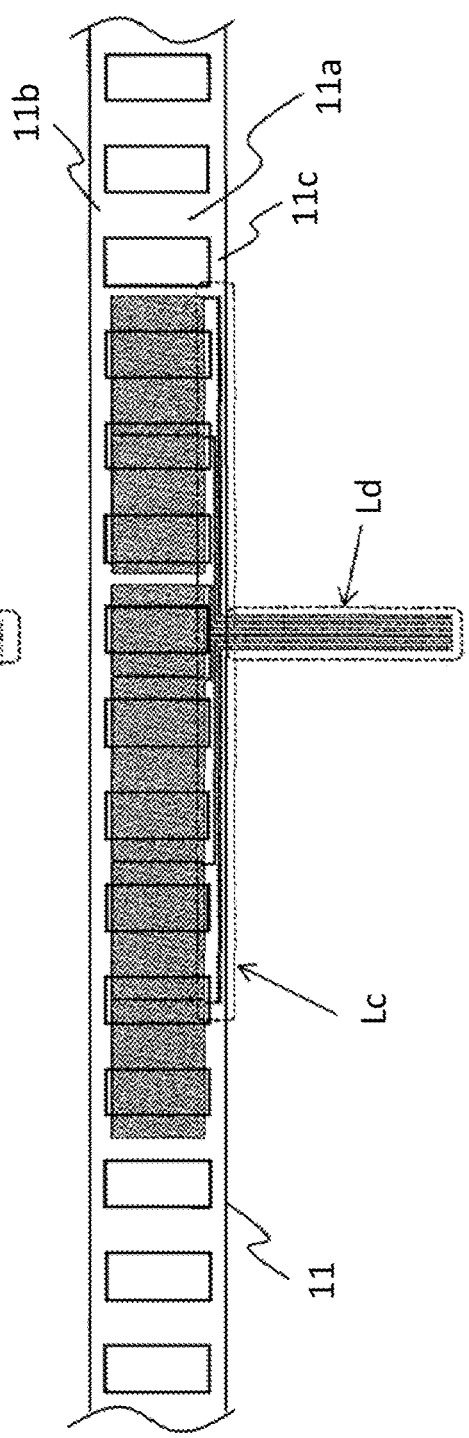

Referring now to FIGS. 11, 12A, and 12B, a description will be given of a second embodiment of the present invention. Since this embodiment is a variation of the fixed electrode 13_1 according to the first embodiment, a duplicate description of common part to the first embodiment will be omitted. FIG. 11 is a plane view of a fixed electrode 13_2 according to this embodiment viewed from the movable electrode 11 side. FIGS. 12A and 12B are plane views illustrating a relationship between the wirings La to Ld in the detection electrodes 13b to 13g in the fixed electrode 13_2 and the movable electrode 11.

As illustrated in FIG. 11, a reference electrode 13_2a in the fixed electrode 13_2 has electrode portions 13_2a1, 13_2a2, and 13_2a3. The electrode portions 13_2a1 are disposed at both ends in the moving direction B. The electrode portion 13_2a2 has a stripe shape that connect these two electrode portions 13_2a1 at both ends to each other. The electrode portion 13_2a3 extends from the electrode portion 13_2a2 to a drawing port used to connect the detection electrodes 13b to 13g to the capacitance detecting circuit 16. Each electrode in the fixed electrode 13_2 in the moving direction B is as long as the fixed electrode 13 illustrated in FIGS. 4A to 4D.

The fixed electrode 13_2 according to this embodiment has no reference electrode with the detection electrodes in the moving direction B as in the electrode portion 13_1a' in the reference electrode 13_1a according to the first embodiment. Hence, the reference electrode 13_2a is smaller than the reference electrode 13_1a according to the first embodiment. An absolute value of the capacitance detected by the fixed electrode 13_2 according to this embodiment is smaller than that of the fixed electrode 13_1 according to the first embodiment, but the fixed electrode 13_2 in the moving direction B is shorter so that the interchangeable lens 1 has a high design freedom.

Next follows a description of a structure that restrains the parasitic capacitance that causes the noises. FIG. 12A illustrates the detection electrodes 13b to 13g arranged in one layer opposite to the movable electrode 11 with respect to the reference electrode 13_2a and the wirings Lc and Ld that are connected to each detection electrode and the capacitance detecting circuit 16. FIG. 12B illustrates the movable electrode 11 overlapping FIG. 12A, and hatches the detection electrodes 13b to 13g.

This embodiment arranges the wiring Lc and the movable electrode 11 via the reference electrode 13_2a in the gap direction in which the movable electrode 11 faces the fixed electrode 13_2 (in the direction vertical to the paper in FIG. 12B). The wiring Lc thus electrostatically coupled with the reference electrode 13_2a can reduce the parasitic capacitance that causes noises. In addition, when the wiring Ld that does not face the movable electrode 11 is also electrostatically coupled with the reference electrode 13_2a, the external parasitic capacitance that causes noises can be restrained.

Third Embodiment

Figure 13:
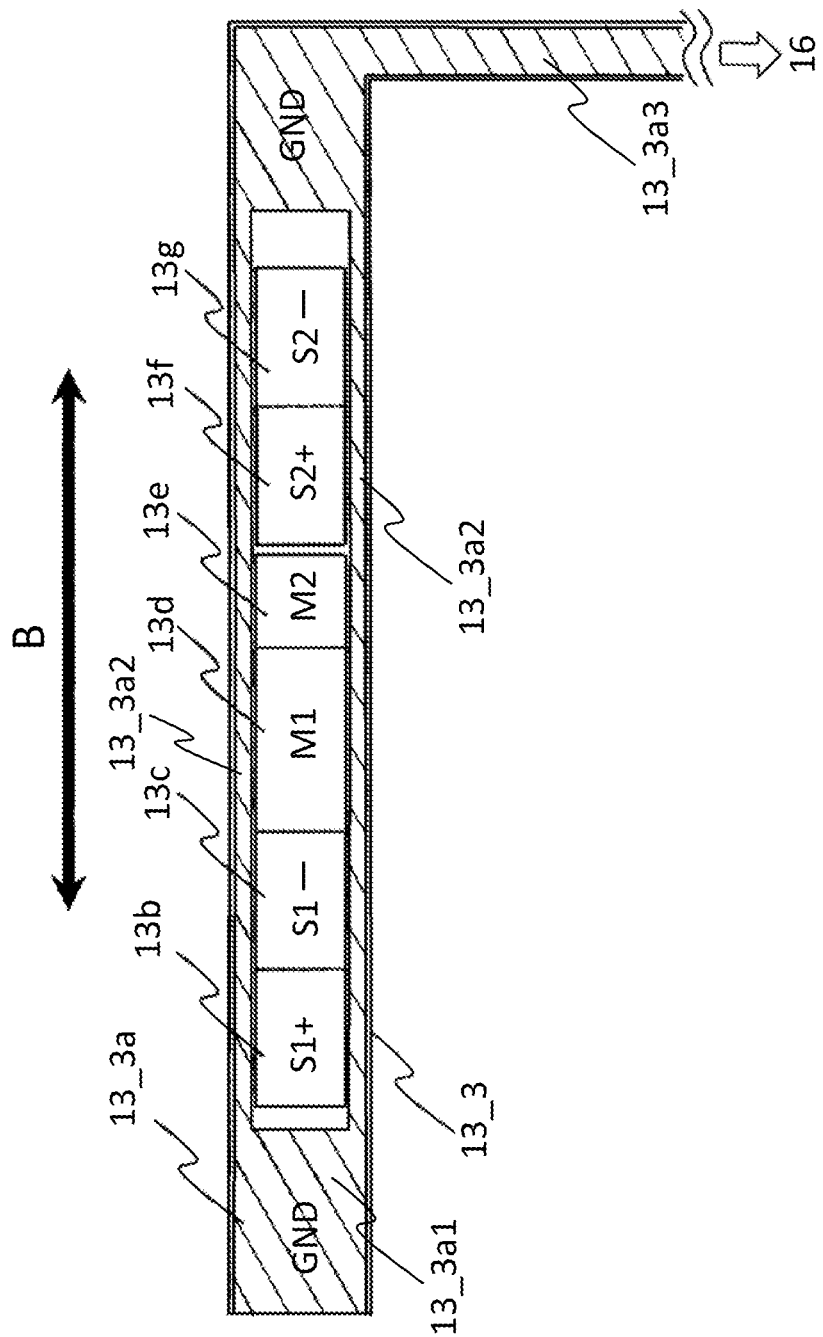
FIG. 13 is a developed view of a fixed electrode according to a third embodiment.

Referring now to FIGS. 13, 14A, and 14B, a description will be given of a third embodiment of the present invention. Since this embodiment is a variation of the fixed electrode 13_1 according to the first embodiment, a duplicate description of common part to the first embodiment will be omitted. FIG. 13 is a plane view of a fixed electrode 13_3 viewed from the movable electrode 11 side according to this embodiment. FIGS. 14A and 14B are plane views illustrating a relationship between the wirings La to Ld in the detection electrodes 13b to 13g in the fixed electrode 13_3 and the movable electrode 11. FIG. 14A illustrates the detection electrodes 13b to 13g arranged in one layer opposite to the movable electrode 11 with respect to the reference electrode 13_3a and the wirings La to Ld that are connected to each detection electrode and the capacitance detecting circuit 16. FIG. 14B illustrates the movable electrode 11 overlapping FIG. 14A, and hatches the detection electrodes 13b to 13g.

As illustrated in FIGS. 13, 14A, and 14B, the reference electrode 13_3a in the fixed electrode 13_3 has electrode portions 13_3a1, 13_3a2, and 13_3a3. The electrode portions 13_3a1 are disposed at both ends in the moving direction B. The electrode portion 13_3a2 has a stripe shape connecting these two electrode portions 13_3a1 at both ends to each other. The electrode portion 13_3a3 extends from one end in the moving direction B (electrode portion 13_3a1) to the drawing port used to connect the detection electrodes 13b to 13g to the capacitance detecting circuit 16.

The fixed electrode 13_2 according to this embodiment has no reference electrode between the detection electrodes in the moving direction B similar to the fixed electrode 13_2 according to the second embodiment. On the other hand, unlike the reference electrode 13_2a according to the second embodiment, the reference electrode 13_3a according to this embodiment has the stripe-shaped electrode portion 13_3a2 connecting the electrode portions 13_3a1 at both ends in the moving direction B to each other, at both ends in the direction C orthogonal to the moving direction B. Hence, when a width d of the fixed electrode 13_3 in the direction C is equal to that of the fixed electrode 13_2 according to the second embodiment, the area of the detection electrode according to this embodiment is smaller but the area of the reference electrode according to this embodiment is larger. Hence, this embodiment can output the capacitance equivalent with that of the second embodiment.

In the fixed electrode 13_3 according to this embodiment, the drawing port connected to the capacitance detecting circuit 16 has a L-shape provided at the end in the moving direction B whereas the drawing port for the fixed electrode 13_2 according to the second embodiment has a T-shape diverging from almost the center rather than the end. When the T-shape is compared with the L-shape, the L-shape is advantageous because it can provide more products per one material sheet in manufacturing the flexible substrate. Thus, the L-shaped fixed electrode 13_3 can be manufactured less expensively than the T-shaped fixed electrode 13_2. In this embodiment, the structure and effects for restraining the parasitic capacitance that causes noises are similar to those in the first and second embodiments.

Fourth Embodiment

Figure 16A:
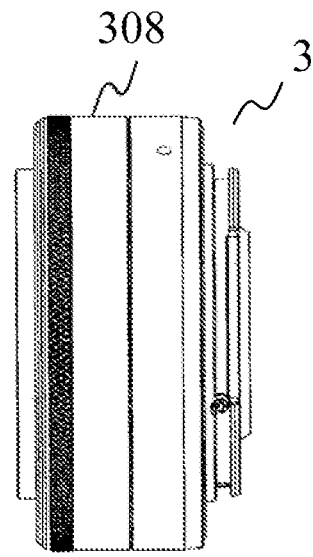
FIGS. 16A, 16B, 16C, and 16D illustrate structures of an interchangeable lens according to a fourth embodiment.
Figure 16B:
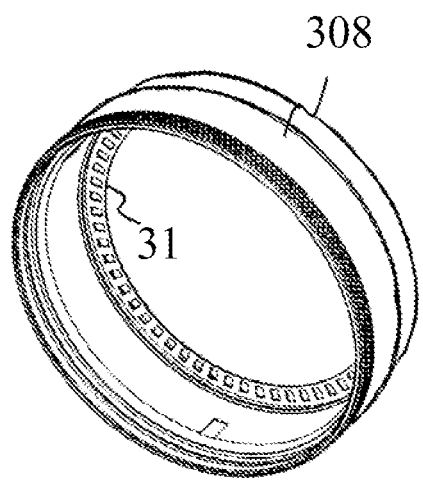

Referring now to FIGS. 16A to 17B, a description will be given of a fourth embodiment according to the present invention. FIG. 16A to 16D illustrate structures of an interchangeable lens 3 according to this embodiment. FIG. 16A is an overview of the interchangeable lens 3. Reference numeral 308 denotes an MF operating ring (movable member). FIG. 16B is a perspective view of the MF operating ring 308. FIG. 16C illustrates the MF operating ring 308 integrated with the movable electrode 31, and the fixed electrode 33 that includes the reference electrode and the detection electrodes, when these components are viewed from the optical axis direction. FIG. 16D illustrates a four-layer hard substrate (multilayer substrate) that includes the fixed electrode 33.

Figure 16C:
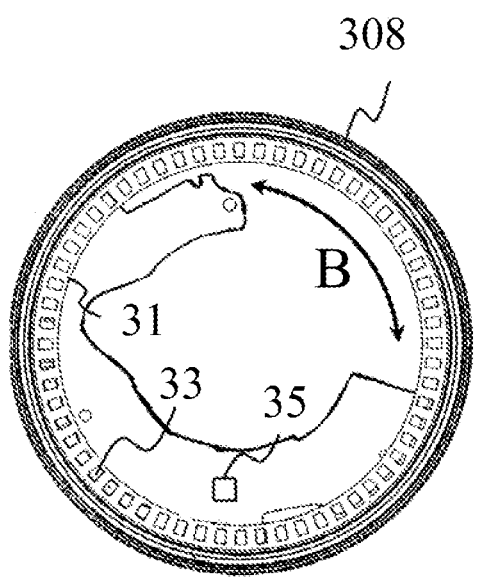

The movable electrode 11 according to the first to third embodiments is a cylindrical electrode, whereas the movable electrode 31 according to this embodiment is a disc-shaped electrode. As illustrated in FIG. 16C, the movable electrode 31 has a repetitive pattern with a fan-shaped electrode in a circumferential direction in which the electrode extends in a radial direction. A so-called comb part in the movable electrode 31 is electrically connected between the outside and the inside and the fan-shaped electrodes are electrically connected.

The fan-shaped fixed electrode 33 that is long in the moving direction B (circumferential direction) has the reference electrode and the detection electrode described in the first embodiment along the circumferential direction, and the detection electrode is connected to a calculation circuit 35 (detector or signal processor), such as an IC, which can detect the capacitance and provide a calculation. The movable electrode 31 and the fixed electrode 33 are opposite to each other with a constant gap in the optical axis direction. The structure according to this embodiment can detect a displacement similar to the first embodiment.

Figure 16D:
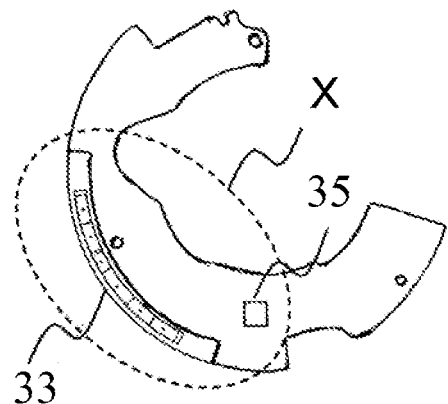
Figure 17A:
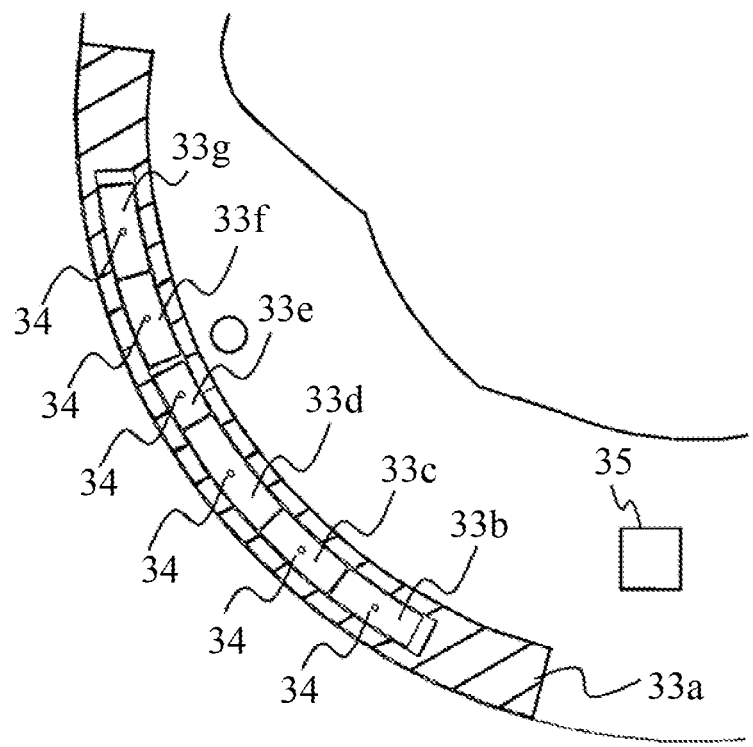
FIGS. 17A and 17B are enlarged views of principal part in FIG. 16D.
Figure 17B:
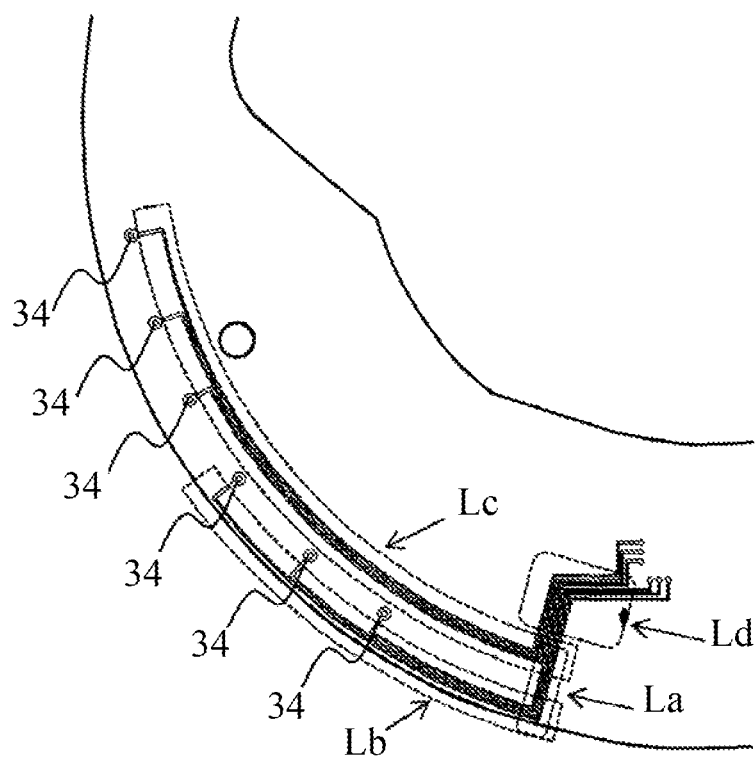

FIGS. 17A and 17B are enlarged views of the area illustrated by a dashed line X in FIG. 16D. FIG. 17A illustrates a first layer of a surface opposite to the movable electrode in the hard substrate according to this embodiment, and FIG. 17B illustrates a second layer in the hard substrate.

As illustrated in FIG. 17A, the fixed electrode 33 extends in the circumferential direction on the surface of the hard substrate opposite to the movable electrode 31, and the fixed electrode 33 has a reference electrode 33a so as to enclose the detection electrodes 33b to 33g. Each of the detection electrodes 33b to 33g is electrically connected to the internal second layer illustrated in FIG. 17B through a through-hole 34 provided at approximate centers of the detection electrodes 33b to 33g, and the calculation circuit 35 via the wirings La to Ld. Thus, this embodiment provides the reference electrode 33a (base electrode segment) and a plurality of detecting electrode segments 33b to 33g (detecting electrode segments) to the first layer in the hard substrate, and the wirings La to Ld to the second layer in the hard substrate. In addition, this embodiment connects the plurality of detection electrodes 33b to 33g to the wirings La to Ld through the through-hole 34.

In a portion in the wirings used to connect the detection electrodes 33b to 33g to the calculation circuit 35 and opposite to the movable electrode 31, the wirings La to Lc are disposed opposite to the movable electrode 31 with respect to the reference electrode 33a similar to the third embodiment, and electrostatically coupled with the reference electrode 33a. However, the wiring Ld that does not face the movable electrode 31 is not electrostatically coupled with the reference electrode 33a. This is because when the interchangeable lens 3 is used, an object (conductor), such as a finger, from the outside never approaches to the wiring Ld and the conductor and the wiring Ld are never electrostatically coupled with each other or never generate noises.

While each embodiment describes a detection of a rotation, a similar configuration can provide similar effects as to a detection of a linear displacement as described with reference to FIGS. 4A to 5. In addition, the fixed electrode and the movable electrode spaced with a gap (interval) form a capacitor (capacitance) in each embodiment, but as long as they have an electric gap, they may mechanically contact each other via an insulation layer.

Thus, the displacement detecting apparatus (operating angle detector 109) in each embodiment has a first electrode (fixed electrodes 13_1, 13_2, 13_3, and 33), a second electrode (movable electrodes 11 and 31), a detector (calculation circuits 17 and 35), and a wiring (wirings La to Ld). The first electrode has a base electrode segment (base electrode segments 13_1a, 13_2a, and 13_3a), and a plurality of detecting electrode segments (13b to 13g). The second electrode has a predetermined periodic pattern, and is movable relative to the first electrode. The detector detects a displacement based on a capacitance between the first electrode and the second electrode. The wiring connects the plurality of detection electrodes and the detector to each other. The wiring facing the second electrode (portion in the wiring that faces the second electrode) is disposed opposite to the second electrode with respect to the base electrode segment. In other words, at least part of the base electrode segment is disposed between the wiring and the second electrode. In other words, the wiring viewed from the second electrode side is covered with the base electrode segment.

The portion in the wiring facing the second electrode may be electrostatically coupled with the base electrode segment. The detector detects a displacement (rotating angle) based on the capacitance between the first electrode and the second electrode. The first electrode may include a substrate having two or more layers, such as a two-layer or double-sided flexible substrate or hard substrate, that contain a first layer and a second layer. This structure may expand the base electrode segment to increase the area. In addition, this structure may arrange the wiring and the base electrode segment opposite to each other in the gap direction and electrostatically couple them to each other. A portion that is not opposite to the second electrode in the wiring (or wiring that does not face the first electrode or the second electrode)

may be electrostatically coupled with the base electrode segment in a direction in which the conductor approaches from the outside so that the base electrode segment is disposed between the wiring and the external conductor. Thus, by enlarging the area of the base electrode segment and electrostatically coupling the wiring to the base electrode segment, the detected capacitance can be made larger and the parasitic capacitance causing noises for the capacitance used for the detector to detect the displacement can be restrained.

Each embodiment can provide a displacement detecting apparatus, a lens barrel, and an imaging apparatus with a low power consumption, a high resolution, and a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment disposes the first electrode (fixed electrode 13) onto the fixed member (guide cylinder 12), and provides the second electrode (movable electrode 11) to the movable member (MF operating ring 108). However, each embodiment is not limited to this example, and the first electrode may be provided to the movable member and the second electrode may be provided to the fixed member.

This application claims the benefit of Japanese Patent Application No. 2017-092639, filed on May 8, 2017, which is hereby incorporated by reference herein in its entirety.

What is claimed is:

1. A displacement detecting apparatus comprising:
a first electrode including a base electrode segment and a plurality of detecting electrode segments;
a second electrode having a predetermined periodic pattern and movable relative to the first electrode;
a detector configured to detect a displacement based on a capacitance between the first electrode and the second electrode; and
a wiring configured to connect the plurality of detecting electrode segments and the detector with each other,
wherein a portion of the wiring facing the second electrode is located opposite to the second electrode with respect to the base electrode segment, and
wherein the portion of the wiring facing the second electrode is electrostatically coupled with the base electrode segment.

2. The displacement detecting apparatus according to claim 1, wherein the first electrode includes a substrate having two or more layers that contain a first layer and a second layer.

3. The displacement detecting apparatus according to claim 2, wherein the base electrode segment is provided to the first layer, and the plurality of detecting electrode segments and the wiring are provided to the second layer.

4. The displacement detecting apparatus according to claim 3, wherein the first electrode includes a flexible substrate.

5. The displacement detecting apparatus according to claim 1, wherein a portion in the wiring that does not face the second electrode is electrostatically coupled with the base electrode segment.

6. The displacement detecting apparatus according to claim 2, wherein the base electrode segment and the plurality of detecting electrode segments are provided to the first layer, the wiring is provided to the second layer, and the plurality of detecting electrode segments are connected to the wiring via a through-hole.

7. A lens barrel comprising:
a fixed member;
a movable member movable relative to the fixed member;
a first electrode including a base electrode segment and a plurality of detecting electrode segments;
a second electrode having a predetermined periodic pattern and movable relative to the first electrode;
a detector configured to detect a displacement based on a capacitance between the first electrode and the second electrode; and
a wiring configured to connect the plurality of detecting electrode segments and the detector with each other,
wherein a portion of the wiring facing the second electrode is located opposite to the second electrode with respect to the base electrode segment, and
wherein the portion of the wiring facing the second electrode is electrostatically coupled with the base electrode segment.

8. The lens barrel according to claim 7, wherein the first electrode is provided to the fixed member, and the second electrode is provided to the movable member.

9. An imaging apparatus comprising:
a lens barrel;
an image sensor configured to photoelectrically convert an optical image formed via an optical system in the lens barrel,
wherein the lens barrel includes:
a fixed member;
a movable member movable relative to the fixed member;
a first electrode including a base electrode segment and a plurality of detecting electrode segments;
a second electrode having a predetermined periodic pattern and movable relative to the first electrode;
a detector configured to detect a displacement based on a capacitance between the first electrode and the second electrode; and
a wiring configured to connect the plurality of detecting electrode segments and the detector with each other,
wherein a portion of the wiring facing the second electrode is located opposite to the second electrode with respect to the base electrode segment, and
wherein the portion of the wiring facing the second electrode is electrostatically coupled with the base electrode segment.

* * * * *